(12) United States Patent
Hall et al.

(10) Patent No.: US 11,665,112 B2
(45) Date of Patent: May 30, 2023

(54) SELF-CHECKING NODE

(71) Applicant: Honeywell International Inc., Charlotte, NC (US)

(72) Inventors: Brendan Hall, Eden Prairie, MN (US); Kevin Raymond Driscoll, Maple Grove, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/411,561

(22) Filed: Aug. 25, 2021

(65) Prior Publication Data

US 2022/0070119 A1 Mar. 3, 2022

Related U.S. Application Data

(60) Provisional application No. 63/073,855, filed on Sep. 2, 2020.

(51) Int. Cl.
| | |
|---|---|
| *H04L 49/55* | (2022.01) |
| *H04L 49/102* | (2022.01) |
| *H04L 45/16* | (2022.01) |
| *H04L 49/00* | (2022.01) |
| *H04L 49/552* | (2022.01) |

(52) U.S. Cl.
CPC ............ *H04L 49/557* (2013.01); *H04L 45/16* (2013.01); *H04L 49/102* (2013.01); *H04L 49/30* (2013.01); *H04L 49/552* (2013.01); *H04L 49/555* (2013.01)

(58) Field of Classification Search
CPC ..... H04L 49/557; H04L 49/102; H04L 49/30; H04L 49/552; H04L 49/555; H04L 45/16
See application file for complete search history.

(56) References Cited

U.S. PATENT DOCUMENTS

| | | | |
|---|---|---|---|
| 5,131,041 A * | 7/1992 | Brunner | H04L 49/557 370/219 |
| 5,822,431 A | 10/1998 | Sprunk | |
| 7,246,186 B2 | 7/2007 | Hall et al. | |
| 7,372,859 B2 | 5/2008 | Hall et al. | |
| 7,502,334 B2 | 3/2009 | Hall et al. | |
| 7,505,470 B2 | 3/2009 | Hall et al. | |

(Continued)

FOREIGN PATENT DOCUMENTS

| | | |
|---|---|---|
| CN | 111612455 A | 9/2020 |
| WO | 2013174024 A1 | 11/2013 |

OTHER PUBLICATIONS

Hall et al. "FlexRay BRAIN Fusion A FlexRay-Based Braided Ring Availability Integrity Network", Apr. 2007, pp. 1 through 18.

(Continued)

*Primary Examiner* — Min Jung
(74) *Attorney, Agent, or Firm* — Fogg & Powers LLC

(57) ABSTRACT

In an example, a method includes forming a first self-checking pair including a self-checking node and a first node adjacent to the self-checking node in a network. The method further includes forming a second self-checking pair including the self-checking node and a second node adjacent to the self-checking node in the network, wherein the self-checking node is between the first node and the second node. The method further includes transmitting a first paired broadcast with the first self-checking pair and transmitting a second paired broadcast with the second self-checking pair.

19 Claims, 10 Drawing Sheets

(56) References Cited

U.S. PATENT DOCUMENTS

| | | |
|---|---|---|
| 7,606,179 B2 | 10/2009 | Hall et al. |
| 7,649,835 B2 | 1/2010 | Hall et al. |
| 7,656,881 B2 | 2/2010 | Hall et al. |
| 7,668,084 B2 | 2/2010 | Driscoll et al. |
| 7,668,204 B2 | 2/2010 | Hall et al. |
| 7,729,297 B2 | 6/2010 | Hall et al. |
| 7,778,159 B2 | 8/2010 | Driscoll et al. |
| 7,830,789 B2 | 11/2010 | Hashiguchi et al. |
| 7,889,683 B2 | 2/2011 | Paulitsch et al. |
| 7,912,094 B2 | 3/2011 | Hall et al. |
| 8,107,382 B2 | 1/2012 | Lin et al. |
| 8,130,773 B2 | 3/2012 | Hall et al. |
| 8,179,787 B2 | 5/2012 | Knapp |
| 8,339,993 B2 | 12/2012 | Paulitsch et al. |
| 8,817,597 B2 | 8/2014 | Hall et al. |
| 8,908,675 B2 | 12/2014 | Hall et al. |
| 8,949,983 B2 | 2/2015 | Hall et al. |
| 8,976,790 B2 | 3/2015 | Hall et al. |
| 9,876,739 B2 | 1/2018 | Sivasankar et al. |
| 9,952,919 B2 | 4/2018 | Feld et al. |
| 10,356,010 B2 | 7/2019 | Takahashi |
| 10,469,323 B2 | 11/2019 | Toilion et al. |
| 10,700,889 B2 * | 6/2020 | Ross .................... H04L 12/437 |
| 10,992,516 B2 | 4/2021 | Hall et al. |
| 2005/0129037 A1 | 6/2005 | Zumsteg et al. |
| 2007/0220175 A1 * | 9/2007 | Khanna ................... H04L 45/22 709/251 |
| 2008/0107050 A1 * | 5/2008 | Paulitsch .............. H04L 12/437 370/296 |
| 2014/0351654 A1 * | 11/2014 | Zhang ................... H04L 49/552 714/43 |
| 2015/0063362 A1 * | 3/2015 | Poledna ................. H04L 45/44 370/400 |
| 2020/0195588 A1 | 6/2020 | Hall et al. |
| 2021/0027288 A1 | 1/2021 | Malkhi et al. |

OTHER PUBLICATIONS

Hall et al. "Ringing Out Fault Tolerance. A New Ring Network For Superior Low-Cost Dependability", Proceedings of the 2005 International Conference on Dependable Systems and Networks (DSN'05), Jan. 2005, pp. 1 through 10, IEEE Computer Society.

Zammali, et al. "A Multi function Error Detection Policy to Enhance Communication Integrity in Critical Embedded Systems", 2014 IEEE 8th International Conference on Software Security and Reliability-Companion (SERE-C), Jun. 2014, pp. 1 through 7, San Francisco, United States.

* cited by examiner

SELF-CHECKING NODE

CROSS-REFERENCE TO RELATED APPLICATIONS

This application claims the benefit of U.S. Provisional Application Ser. No. 63/073,855, filed Sep. 2, 2020, and titled "COMPRESSED AND EFFICIENT BYZANTINE AGREEMENT," which is hereby incorporated herein by reference.

SUMMARY

In an example, a method includes forming a first self-checking pair including a self-checking node and a first node adjacent to the self-checking node in a network. The method further includes forming a second self-checking pair including the self-checking node and a second node adjacent to the self-checking node in the network, wherein the self-checking node is between the first node and the second node. The method further includes transmitting a first paired broadcast with the first self-checking pair and transmitting a second paired broadcast with the second self-checking pair.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
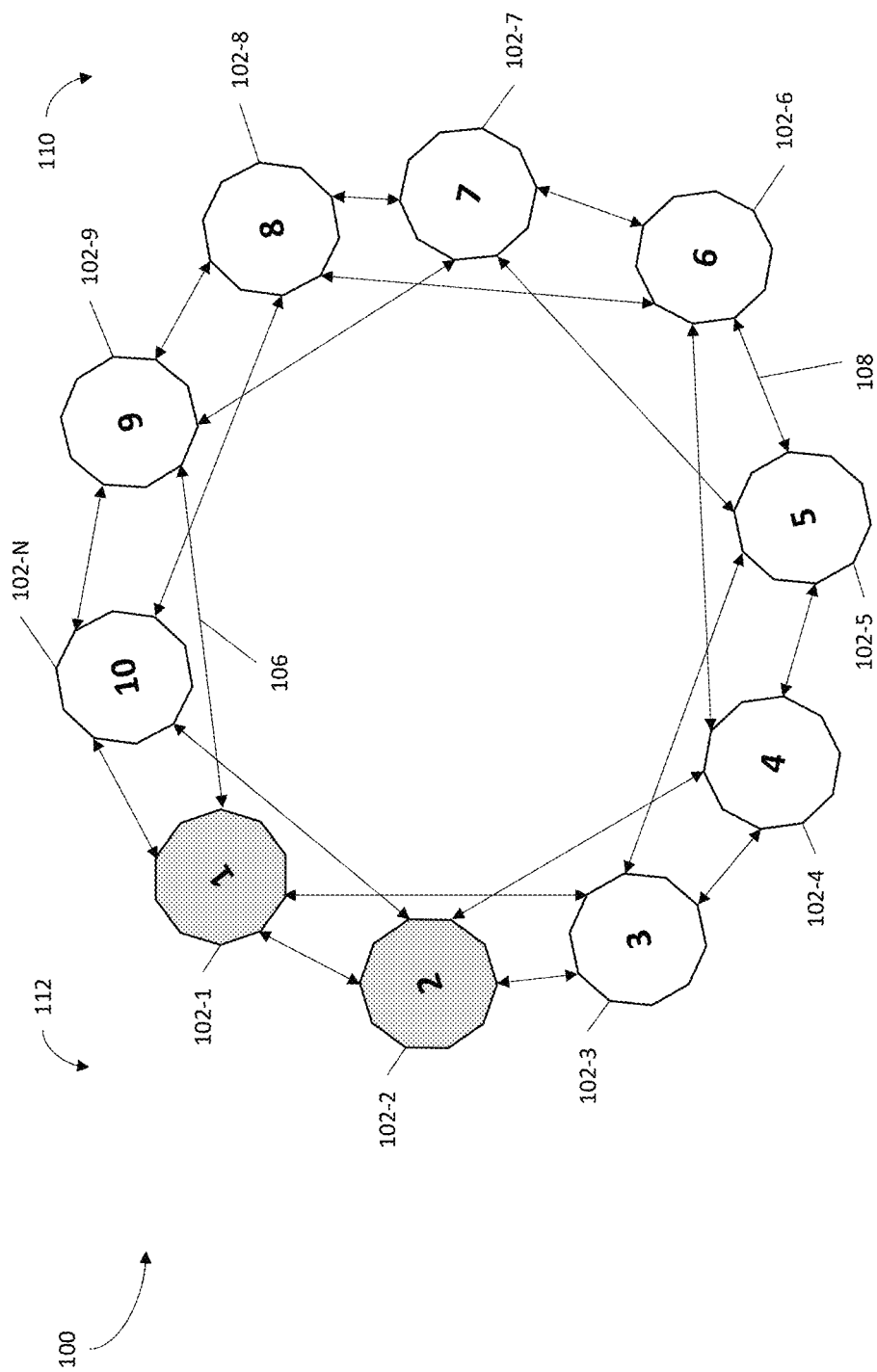
FIG. 1 is a diagram of an example of a network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

There is need for a network that can transfer data among its nodes such that the data is delivered consistently (all receivers get the same data or all reject the data) while tolerating a minimum of one fault having arbitrary errors (babbling, Byzantine, inconsistent omission, masquerading, etc.) and one other non-colluding failure. Generally, a non-colluding failure is a second independent failure that does not cause, contribute to the cause(s), or otherwise help to create or sustain another active failure in other system components, but nonetheless has effects that interact with the other active failures where the ensemble of failures could result in system failure. An active failure is a failure that generates continual changes of state for some period of time, but the majority of failures are not active failures. The majority of failures include, for example, opens, shorts, and stuck-ats that create static symptoms. Note that while shorts can have active "output," the activity comes from the input to the short; the short failure itself is not the source of the activity. A colluding failure is a failure in a system component that cause, contribute to the cause(s), or otherwise help to create or sustain at least one active failure in other system components, such that the ensemble of component failures leads to a system failure. A typical colluding failure scenario has multiple failed redundant components that produce the same erroneous symptoms. Another typical colluding failure scenario is a coverage failure, where the elements of a fault-tolerance design that exist to provide failure mitigation themselves fail in a manner that makes the intended mitigation ineffective.

The techniques described herein allow a system to operate with a failure and still meet the stringent requirement of having less than a $10^{-9}$ probability of a system failure resulting from a second failure in a one-hour exposure (derived from Federal Aviation Administration (FAA) and similar requirements). Consistent data exchange among redundant components is a requirement for almost all fault-tolerant digital systems. If consistency is not provided by the network, it must be provided by other mechanisms that are very expensive in computation overheads and computation bandwidth.

Within the embedded space, the classical solutions for achieving consistent broadcast often incur too much overhead. For example, the required number of physical links, the number of required network inter-stages, and the large bandwidth overhead required to support multiple rounds of message exchange and voting are often too high. It is desirable that a network achieve consistent broadcast while incurring the least amount of hardware and software cost, which includes not only procurement cost, but also size, weight, power, and consumption of other system resources.

The example networks described herein improve upon the systems and methods of previous implementations. The example networks described herein significantly reduce overhead and brittleness compared to previous solutions. Further, the example networks described herein minimize network costs (size, weight, and power) while achieving a "fly with failure" capability, and eliminating the software complexity, large data exchange bandwidth overhead, and verification costs of typical ad hoc solutions, and other prior solutions. Further, the examples described herein provide the highest protection against cyber intrusion attacks that propagate across intranets.

FIG. 1 is a diagram of an example of an example transmission communication network 100. Communication network 100 includes a plurality of nodes 102-1 . . . 102-N. The nodes 102 of FIG. 1 are individually referenced herein as node 1 through node 10. Although ten nodes are shown in FIG. 1, it is to be understood that any number of nodes greater than or equal to four can be used in other examples. Each of the nodes 102 is coupled to each of its immediate or adjacent neighbors (also referred to herein using adjectives "adjacent", "direct", or "near" and nouns "neighbor" or "node") via respective near links 108 and to each of its near neighbors' neighbor (also referred to herein as a "skip neighbor" or "skip neighbor node") via respective skip links 106. As shown in FIG. 1, near links 108 and skip links 106 are implemented using full-duplex bi-directional links, which include unidirectional paths for each direction of the link. However, it is to be understood that, in other examples, near links 108 and skip links 106 are implemented using half-duplex bidirectional links.

Each node 102 has two near neighbor nodes 102, one in the clockwise direction (referred to here as the "right near neighbor node" or "right near neighbor") and one in the counterclockwise direction (also referred to here as the "left near neighbor node" or "left near neighbor"). For example, the right near neighbor node 102 for node 1 is node 10 and the left near neighbor node 102 for node 1 is node 2. In addition, each node 102 has two skip neighbor nodes 102 in this example, one in the clockwise direction (also referred to here as the "right skip neighbor node" or "right skip neighbor") and one in the counterclockwise direction (also referred to here as the "left skip neighbor node" or "left skip neighbor"). For example, the right skip neighbor node for node 1 is node 9 and the left skip neighbor node for node 1 is node 3.

As used herein, when a link 106, 108 is described as being connected "from" a first node 102 "to" a second node 102, the link 106, 108 provides a communication path for the first node 102 to send data to the second node 102 over the link 106, 108. That is, the direction of communication for that link 106, 108 is from the first node 102 to the second node 102.

For the sake of illustration, the details of nodes 102 are not shown in FIG. 1. However, it is understood that the nodes 102 are implemented using suitable hardware and/or software to implement the functionality described here as being performed by the nodes 102. Each such node 102 also includes a suitable network or other interface for communicatively coupling that node to the links 106 and 108. Examples of suitable node implementations are described in U.S. Pat. No. 7,606,179 (hereinafter "the '179 patent") and U.S. Pat. No. 7,372,859 (hereinafter "the '859 patent"), which are hereby incorporated herein by reference. It should be understood that the nodes 102 can be implemented other ways.

The links 106 and 108 are used to form at least three logical communication paths. In the particular example shown in FIG. 1, a first logical communication path around the ring in a first direction 110 (for example, in a clockwise direction as shown in FIG. 1), a second logical communication path around the ring in a second direction 112 (for example, in a counterclockwise direction as shown in FIG. 1), and a third logical communication path that uses both logical communication paths simultaneously (referred to herein as the bidirectional communication path). Each node 102 of the network 100 is communicatively coupled to both communication paths to tolerate the desired fault set.

For the respective direction 110, 112 in which data flows in the communication paths, the communication paths communicatively directly couple each node 102 to at least two other nodes 102 from which that node 102 receives data (also referred to herein as "receive-from nodes") and to at least two other nodes 102 to which that node 102 transmits data (also referred to here as the "transmit-to nodes"). In some examples, one of the received-from nodes 102 is designated as a "primary" receive-from node 102 and the other receive-from nodes 102 are designated as "secondary" receive-from nodes 102. When a node "relays" data in a particular direction 110, 112, the node 102 receives data on a skip link 106 and forwards the data received on the skip link 106 onto the one or more transmit-to nodes. That is, when a node 102 is relaying data, the node 102 is not the source of the data that the node 102 is forwarding the data onto other nodes. In some examples, when a node 102 "relays" data, that node 102 receives data from the primary receive-from node 102 over the skip link 106 and forwards the received data onto each of the transmit-to nodes designated for that node 102. Data received by a node from the secondary receive-from nodes 102 over the near link 108 is used for the various comparison operations described below, but the data received over the near link 108 is not relayed or forwarded onto other nodes 102. When a given node 102 "transmits" data (that is, when the given node 102 is the source of data communicated on the network 100) in the particular direction 110, 112, that node 102 transmits the data to each of the transmit-to nodes 102 designated for that node 102 for the respective direction 110, 112.

In the particular example shown in FIG. 1, the nodes 102 are arranged in a ring having a "braided ring" topology in which the nodes 102 communicate with one another over multiple communication paths in multiple direction 110, 112. In the particular example shown in FIG. 1, ten nodes 102 communicate with one another over the first communication path in the first direction 110, the second communication path in the second direction 112, and the bidirectional communication path. In other examples, a different topology that includes disjoint communication paths, a different number of nodes 102, and/or a different type of nodes 102 are used. For example, the nodes 102 could be arranged in a mesh network topology where the routing paths are constrained such that redundant copies of a communication received by a receiver do not follow the same path to the receiver.

In the particular example shown in FIG. 1, the network 100 is implemented as a peer-to-peer network in which each transmission is intended to be received by each node 102 of the network 100. In other examples, each transmission is intended for a particular destination node (a.k.a., unicast) or a proper subset of nodes (a.k.a., multicast). Nodes not intended for transmission reception may be involved in relaying a transmission from a transmission source to intended receivers. Moreover, in the examples described here, data is communicated in the network 100 in the form of frames of data though it is to be understood that, in other examples, other units of data are communicated over the network 100.

Generally speaking, all nodes 102 of the communication network 100 do not need all of the data transmitted in the network 100. Only a subset of all data transmitted with the communication network 100 is high-integrity and another subset of all data transmitted with the communication network 100, which is largely disjoint, requires high-bandwidth. As a result, nodes adjacent to the receiving nodes only forward a subset of the global traffic of the communication network 100 to their near links, which is used to qualify the reception of the data received from the skip links as discussed below.

In view of the above, in some examples, the skip links 106 and the near links 108 are implemented using different speed communication links. In some examples, the skip links 106 are implemented using a higher speed communication medium than the near links 108. For example, the skip links 106 could be implemented using a 10 Gbps communication medium and the near links 108 could be implemented using a 1 Gbps communication medium. In some examples, the low-speed near links 108 are used to convey signatures for high-integrity messages rather than entirely repeating high-integrity messages. While this saves bandwidth, it is less desirable than full replication from an integrity point of view.

Figure 2:
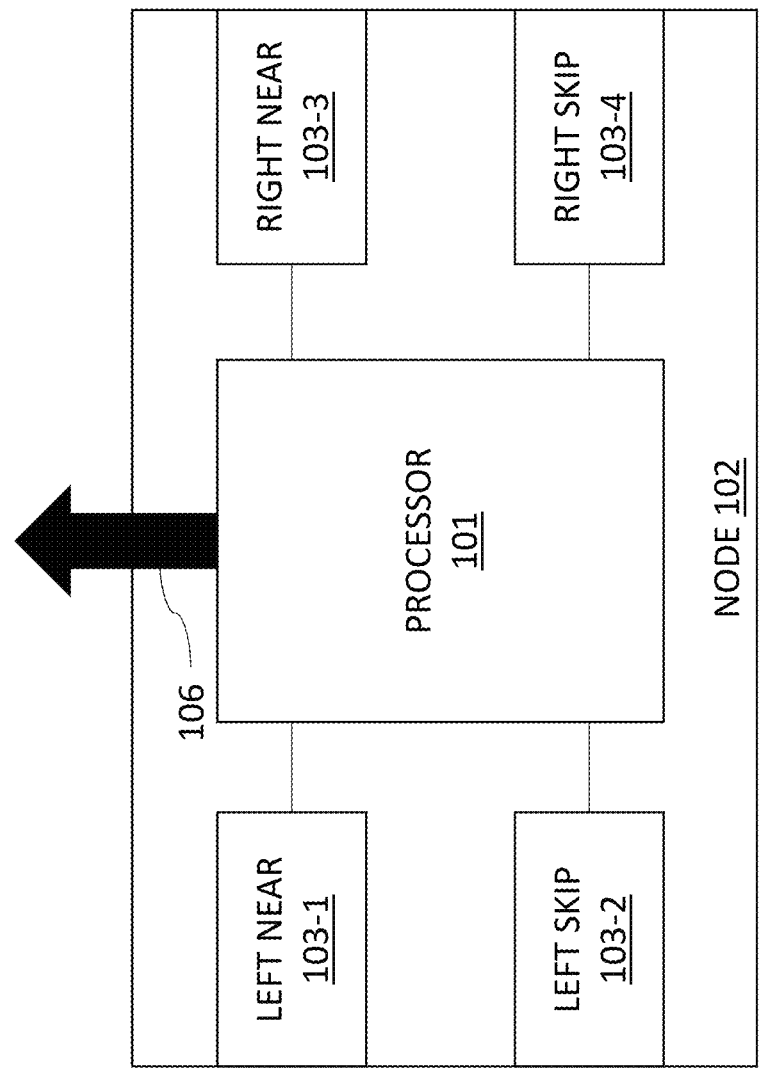
FIG. 2 is a block diagram of an example of a communication node.

FIG. 2 is a block diagram of an exemplary node 102 that can be implemented in a communication network such as network 100 above. Node 102 includes a processor 101, a plurality of ports 103, and a local input/output (I/O) 105. It is to be understood that in some examples, the links coupling the node 102 to other nodes are implemented using full-duplex bi-directional links and, in other examples, the links are implemented using half-duplex bi-directional links. In addition, as used herein, the term "communicating data" refers to either transmitting data or relaying data, whereas "transmitting" refers to outputting data that is sourced at the node 102 and "relaying" refers to outputting data that is sourced from another node and received at node 102.

Node 102 includes a left near port 103-1 configured to receive data in the first direction 110 from a left near neighbor node adjacent to the node 102, where the left near neighbor node is positioned counterclockwise compared to the node 102 in the braided ring communication network 100. The left near port 103-1 also is configured to send data to the left near neighbor node in a second direction 112 via the left near link.

Node 102 also includes a left skip port 103-2 configured to receive data in the first direction 110 from a left skip neighbor node, where the left skip neighbor node is positioned counterclockwise compared to the node 102 in the braided ring communication network 100. The left skip port 103-2 also is configured to send data to the left skip neighbor node in the second direction 112 via the left skip link.

Node 102 also includes right near port 103-3 configured to receive data in the second direction 112 from a right near neighbor node adjacent to the node 102, where the right near neighbor node is positioned clockwise compared to the node 102 in the braided ring communication network 100. The right near port 103-3 also is configured to send data to the right near neighbor node in the first direction 110 via the right near link.

Node 102 also includes right skip port 103-4 configured to receive data in the second direction 112 from a right skip neighbor node, where the right skip neighbor node is positioned clockwise compared to the node 102 in the braided ring communication network 100. The right skip port 103-4 also is configured to send data to the right skip neighbor node in the first direction 110 via the right skip link.

In some examples, processor 101 is configurable to communicate with one of the first neighbor node or the second neighbor node to form a self-checking pair, which can be a true pair (for example, two source nodes transmitting identical data) or a virtual pair (for example, a single source node and another node transmitting identical data sourced from the single source node) as described in U.S. Pat. No. 8,908,675 (hereinafter "the '675 patent"), which is incorporated herein by reference. When the node 102 sources data to be transmitted to other nodes of the network, the processor 101 determines when to form a self-checking pair with one of its neighbor nodes, which could be near neighbor nodes or skip neighbor nodes. In some examples, the processor 101 analyzes a transmission schedule to determine when to form a self-checking pair and with which neighbor to form the pair. In some such examples, the processor 101 performs a rendezvous with the other neighbor node forming the self-checking pair prior to transmission as discussed below. In some examples, the processor 101 directs the transmission of the data being sourced by the node 102 to the other neighbor node forming the virtual self-checking pair prior to, or concurrently with, a scheduled timeslot in which the node 102 is to transmit the data to the other nodes of the network as discussed in the '675 patent.

In the particular example shown in FIG. 1, for the clockwise communication path 110, the receive-from nodes for each node 102 are that node's left near neighbor and left skip neighbor and the transmit-to nodes for each node 102 are that node's right near neighbor and right skip neighbor. In the examples described herein, when transmissions are relayed from node to node in the clockwise direction 110 ("clockwise relay"), the primary receive-from node is each node's left skip neighbor, so only data received from the left skip neighbor is relayed. A clockwise relay includes relaying the data received at the left skip port 103-2 to the right near port 103-3 and the right skip port 103-4.

In the particular example shown in FIG. 1, for the communication path in the counterclockwise direction 112, the receive-from nodes for each node 102 are that node's right near neighbor and right skip neighbor and the transmit-to nodes for each node 102 are that node's left near neighbor and left skip neighbor. In the examples described herein, when transmissions are relayed from node to node in the counterclockwise direction 112 ("counterclockwise relay"), the primary receive-from node is each node's right skip neighbor, so only data received from the right skip neighbor is relayed. A counterclockwise relay includes relaying the data received at the right skip port 103-4 to the left near port 103-1 and the left skip port 103-2.

In some examples, the sequence of messages, the 'messages' sizes, the periods of time (timeslots) when each message may be transmitted, and the roles of transmitter, receiver, and relayer for each message is defined in a schedule table for the communication network 100 and each node 102 of the communication network 100 includes a copy of the schedule table. Each node is configured to synchronously step through its copy of the table to know which node 102 has which role for each message. At the beginning of each timeslot, each node 102 determines its role from the schedule table and performs the particular actions for that particular type of node role.

In some examples, two of the nodes 102 are configured to form a self-checking pair with each other to source data, which could be a real self-checking pair (also referred to herein as a "true pair") or a virtual self-checking pair (also referred to herein as a "virtual pair"). In the example shown in FIG. 1, node 1 forms a self-checking pair with node 2, which is indicated through the gray color of nodes 1 and 2 in FIG. 1. Nodes 1 and 2 then act as a self-checking pair to output the data to the other nodes of the network 100. It should be understood that a node 102 can form a self-checking pair with any of its near neighbors or skip neighbors in the examples described herein and other self-checking pairs that include different combinations of nodes besides nodes 1 and 2 can also be formed and source data.

Traditionally, the self-checking pairs were limited to being formed using adjacent nodes (for example, right near neighbor or left near neighbor) and the self-checking pair assignments were fixed. Different self-checking pairs were establishing using separate hardware components, and a failure of one of the nodes of that self-checking pair would limit the utility of the other node of that self-checking pair.

In some examples, each node in the communication network can maintain multiple self-checking pair associations. For example, each node can maintain a self-checking pair association with each of its skip neighbors and each of its near neighbors (up to 4 associations possible). An association comprises I/O and replicated self-checking computations, and the point-to-point connection between a node and its 'pair' is used for ingress congruency agreements. The nodes that formed the different self-checking pairs are configured to replicate computation on more than one node. The approach is very amenable to parallel context architectures (such as, for example, the Kalray Massively Parallel Processor Array (MPPA)), which makes maintaining the parallel associations relatively straight forward.

Figure 3B:
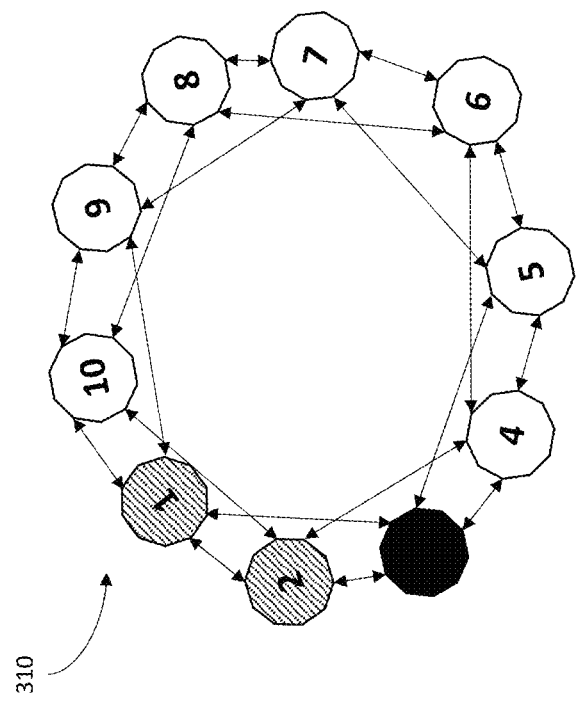
FIGS. 3A-3D are diagrams depicting exemplary self-checking pair associations of communication nodes in a network.
Figure 3A:
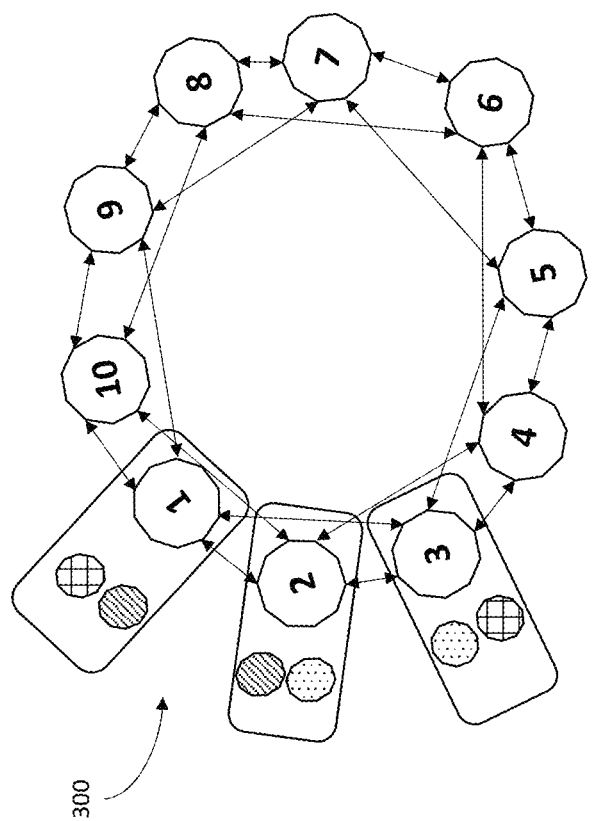
Figure 3D:
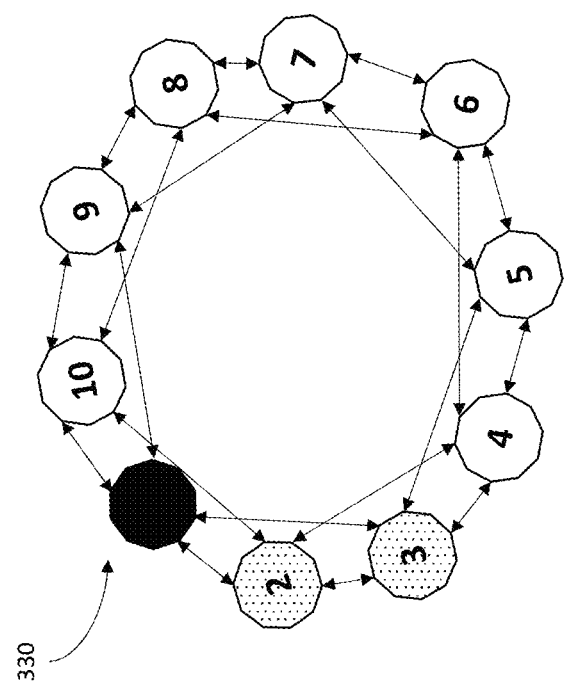

FIGS. 3A-3D depict a more flexible system for self-checking pair formation for three communication nodes. In the examples shown in FIGS. 3A-3D, three different self-checking pairs can be simultaneously maintained using three nodes. In the example network shown in FIG. 3A, nodes 1-3 are each shown as being part of two distinct self-checking pairs. The three distinct self-checking pairs associations include a first self-checking pair 310 with node 1 paired with node 2 (FIG. 3B), a second self-checking pair 320 with node 1 paired with node 3 (FIG. 3C), and a third self-checking pair 330 with node 2 paired with node 3 (FIG. 3D). Even if there is a failure of one of the three nodes (for example, node 1), the flexible system shown in FIGS. 3A-3D would still include a high-integrity pair with which to transmit.

Figure 3C:
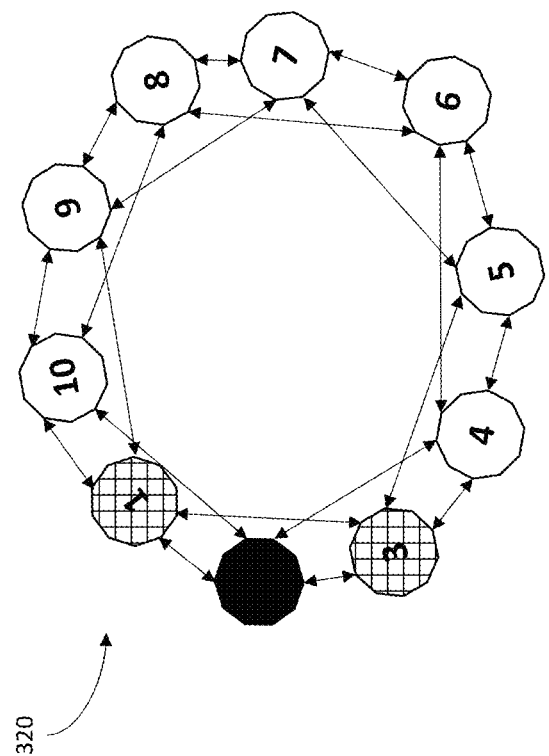

In some examples, the different self-checking pairs 310, 320, 330 are scheduled to transmit in particular distinct times slots. For example, the self-checking pairs shown in FIGS. 3B-3D can be scheduled to transmit in separate time slots and transmit in sequential order. In such examples, if one of the self-checking pairs 310, 320, 330 fail, then the slot allocated to the self-checking pair would remain empty. In other examples, the self-checking pairs shown in FIGS. 3B-3D are scheduled to share a time slot and could be scheduled to transmit a few bits apart in the same slot using an event-driven mini-slotting sub-protocol. In such examples, the first self-checking pair to transmit can obtain the entire time slot for transmission. For example, self-checking pair 310 could be scheduled to transmit first, self-checking pair 320 second, and self-checking pair 330 third. If self-checking pair 310 is operational and transmits first, then self-checking pair 310 obtains the entire time slot for transmission. However, if self-checking pair 310 does not transmit, then self-checking pair 320 and self-checking pair 330 have an opportunity to transmit and obtain the entire time slot.

In previous systems, the communication network would have required six communication nodes to form three different self-checking pairs since the self-checking pair assignments were fixed. The examples described above provide more flexibility in forming self-checking pairs and can do so with less hardware, which reduces cost of the system. The added flexibility and less hardware are particularly advantageous for applications with long mission times where hardware is scarce, such as space exploration.

While the above examples are described with respect to using three nodes for flexible self-checking pair formation, it should be understood that this for ease of illustration. Similar concepts can be applied to groups of four or more communication nodes. However, with a group of four nodes, one of the variations of self-checking pairs would fail if both middle nodes failed. Similar fault scenarios would also occur for groups of more than four nodes. As discussed in more detail below, the hop count acceptance criteria varies depending on whether the member nodes of the self-checking pair are near neighbors or skip neighbors.

Operation of the nodes of a self-checking pair (identified in gray in FIG. 4 and FIG. 6) and the other nodes of the communication network is discussed below with respect to FIG. 4 and FIG. 6. It should be understood that the designation of the particular nodes for the self-checking pair and the relay nodes is for ease of description and that in practice the nodes will likely have different roles for different timeslots depending on the circumstances.

The communication network 100 shown in FIG. 1 can communicate using two distinct data propagation techniques: cut-through flooding propagation and store-and-forward-message propagation. In some examples, the communication network 100 in FIG. 1 is configured to communicate using cut-through flooding propagation and store-and-forward-message propagation at different times (for example, during different timeslots). The operation of the communication network varies depending on the particular data propagation technique used, so the cut-through flooding propagation will be described first, and the store-and-forward message propagation will be described after. FIG. 4 is a diagram depicting exemplary propagation of data in an example of a communication system that uses cut-through flooding propagation.

Cut-Through Flooding Propagation

As discussed herein, cut-through flooding propagation involves a continuous data stream being transmitted between nodes. In some examples, the communication network 100 uses a synchronous Media Access Control (MAC) in order to enable the cut-through flooding propagation and this greatly simplifies the hardware by eliminating any message buffering in the message propagation path. The cut-through flooding propagation involves a few bits or a few bytes relay delay per hop when transmitting. In some examples, the cut-through flooding propagation includes using a serial communication protocol such as, for example, UART or other similar protocols with no standard frame or message structure. In other examples, the cut-through flooding propagation includes using an Ethernet protocol. In other examples, the cut-through flooding propagation includes using other standard frame protocols such as, for example, Synchronous Data Link Control (SDLC), High-Level Data Link Control (HDLC), Distributed Network Protocol 3 (DNP3), Consistent Overhead Byte Stuffing (COBS), or the like.

Each member of the self-checking pair, in this example nodes 1 and 2, is configured to operate in a similar manner. In the example shown in FIG. 4, the members of the self-checking pair are near neighbors (connected via a near link). For ease of description, the operation of the communication network will be described when nodes 1 and 2 are the members of the self-checking pair. However, it should be understood that other combinations of nodes could also form a self-checking pair (for example, as described above) and the concepts described herein are generally applicable to other combinations for a self-checking pair. In examples where the nodes of the self-checking pair are not adjacent (such as, for example, the pair shown in FIG. 3C), the node in between the two members of the self-checking pair is configured to form a virtual pair with each member of the self-checking pair for the broadcast prior to the timeslot where the self-checking pair is scheduled to broadcast. In such examples, the broadcast utilizing the members of the self-checking pair and the middle node will support consistent hop count requirements for acceptance compared to self-checking pairs where the member nodes are adjacent to one another.

In some examples, nodes 1 and 2 form a real self-checking pair and are referred to generally as the right member and the left member, where the right member is positioned clockwise from the other member of the self-checking pair and the left member is positioned counter-clockwise from the other member of the self-checking pair. In this example, node 2 is the left member and node 1 is the right member. In other examples, nodes 1 and 2 form a virtual self-checking pair and are referred to generally as the source (the simplex source of data) and the attester (the node in a virtual pair that initially does not have the data that is to be transmitted). Similar to the description above, a right source or attester is positioned clockwise from the other member of the virtual pair and the left source or attester is positioned counterclockwise from the other member of the virtual pair. In the example shown in FIG. 4, node 1 would be a right source (if node 1 sources the data) or attester (if node 2 sources the data) and node 2 would be a left source (if node 2 sources the data) or attester (if node 1 sources the data). The term "self-checking pair" is used hereafter to refer to either a real self-checking pair or a virtual self-checking pair.

Prior to transmission, where nodes 1 and 2 are to operate as a self-checking pair, nodes 1 and 2 use their private near link 108 to rendezvous and align coordinated processing. This rendezvous is used to ensure that the nodes agree on the protocol state and time before a paired transmission is attempted. This may, for instance, be used to check that the bounded time-difference from a rendezvous is agreed and confirm the clock quality of each node. Other self-test or built-in self-test queries may also be formed. If all tests and queries are successful, the self-checking pair use a point-to-point link to synchronize action for a coordinated "paired transmission."

At the beginning of a timeslot where the nodes 1 and 2 are configured to operate as a self-checking pair, both node 1 and node 2 will kill or otherwise terminate any data stream currently being relayed by node 1 or node 2. This operation enables the self-checking pair to prevent a babbling node from interfering with this timeslot's transmission of data from the self-checking pair.

The nodes of the self-checking pair proceed with waiting a particular delay time, which is an implementation dependent delay from the start of the timeslot to the start of the transmission time. Waiting for the particular delay time ensures that the termination of current data streams has completed. In some examples, there is also a delay in the timeslot from the beginning of the timeslot to the start of the transmission time to allow for clock skew between the transmitter and the receivers.

When the delay time expires, each node of the self-checking pair proceeds with transmitting data streams on all ports. In particular, each node of the self-checking pair transmits an identical data stream from its left near port 103-1 and left skip port 103-2 in the counterclockwise direction and from its right near port 103-3 and right skip port 103-4 in the clockwise direction. In this example, node 2 transmits a data stream to node 3 via a near link and to node 4 via a skip link in the counterclockwise direction and transmits the data stream to node 1 via a near link and to node 10 via a skip link in the clockwise direction. Similarly, node 1 transmits a data stream to node 2 via a near link and to node 3 via a skip link in the counterclockwise direction and to node 10 via a near link and to node 9 via a skip link in the clockwise direction. The data streams transmitted from nodes 1 and 2 have a hop count of zero, which indicates that nodes 1 and 2 are the source of the data. The data stream transmissions from nodes 1 and 2 take place simultaneously.

In some examples, each other node 3-10 in the communication network operates as a relay node in the cut-through flooding propagation approach. As discussed above, the relay nodes 3-10 only forward data streams that are received via a skip link. This approach ensures that the distinct communication paths in each direction are maintained. In some examples, each relay node continuously compares the data stream it receives on the near link with the data stream it receives on a skip link in each direction and only increments the hop count when a mismatch (different data streams or missing near link data) is detected or when the hop count it receives is greater than zero. By incrementing the hop count for mismatched data streams or when a hop count is greater than zero, the relay nodes effectively cause the data streams not to be accepted because the hop count will not satisfy the criteria discussed below. Further, in some examples, each relay node can receive and validate data streams from a self-checking pair received via the bidirectional communication path. In such examples, each relay node continuously compares a data stream received in the first direction (on the near link or skip link) with a data stream received in the second direction (on the near link or skip link).

In some examples, the relay node is configured to increment a hop count value of a relayed data stream when a mismatch is detected in a particular direction of communication or when the hop count it receives is greater than zero. In some examples, the hop count is attached to its data stream as it traverses the ring in a hop count field at the end of the data stream. In some examples, the hop count value is set and/or incremented in the hardware components at the Data Link Layer of the node prior to forwarding the data. In other examples, the hop count value is incremented in the Application Layer by the processor 101 running a higher-level application.

In some examples, the term "increments" refers to increasing the hop count value (for example, incrementing by a positive value). In such examples, the hop count value is initially set to zero by the nodes that source the data and each relay node that detects a mismatch increases the received hop count value. Since only data streams received via a skip link are relayed, the function used to increment the hop count value received over the skip link is configured to compensate for the node that is bypassed. In some examples, the hop count value is increased by '2' if received over a skip link that bypasses a single node. In other words, the function adds 'M+1' to the hop count value received over the skip link, where M is equal to the number of nodes bypassed by the skip link. The relay nodes are configured to increment the hop count value received in both directions (that is, clockwise and counterclockwise directions).

In some examples, the nodes are also configured to prevent the hop count value from being a negative value and to prevent the increment from causing a "roll-over." In particular, the hop count is held in a finite field that has no specific representation for a negative number. Thus, the effect of trying to represent a negative number will result in a roll-over, e.g., if the increment tries to add one to hop count that is already the largest value. In some examples, the nodes prevent negative hop counts by refusing to relay any data where the hop count increment resulted in a roll-over. In other examples, the nodes prevent negative hop counts by setting an "invalid" flag for data that have an associated hop count resulting from a roll-over.

By preventing a negative value in the hop count, the nodes help prevent a node that sources data from masquerading as a different node. In particular, in order to accept the data for processing, in some examples, the node combines the hop count values received over the bidirectional communication path and compares the combined hop count value with a predetermined value as described, for example, in U.S. Pat. No. 7,778,159 (hereinafter the '159 patent), which is hereby incorporated herein by reference. In some such examples, for a paired source where each half of the pair transmits data with an initial hop count of zero, if the combined hop count for the bidirectional communication path does not indicate a total number of hops for the bidirectional communication path as less than N, where N is the total number of nodes in the network, the node determines that a masquerade or similar fault has occurred. For example, since the data is transported around the network in both the first and second directions, the hop count value can be used to identify the node that sourced the data. The source node cannot successfully act as a different node since the hop count values will not be proper for predetermined value since a negative value is not permitted. The prevention of negative values means that any attempt at masquerading will result in the total hops in the bidirectional communication path being larger than the N for the masquerade-free paired-source case. In some examples, data can be sent from a self-checking pair where the members of the self-checking pair are skip neighbors. In these examples, the total number of hops for would be N−2.

In other examples, decrements or increments of other number representations (for example, Gray code, LFSR sequence, or the like) can be used to count the hops. In some examples, any finite state machine that can count, in some sense, can be used to implement the hop count. In these scenarios, it should be understood that the hop counts received on the bidirectional communication path can be compared with a predetermined value in such a manner that enables the node to determine the total number of nodes in the communication network and whether a masquerade or similar fault has occurred.

Figure 4:
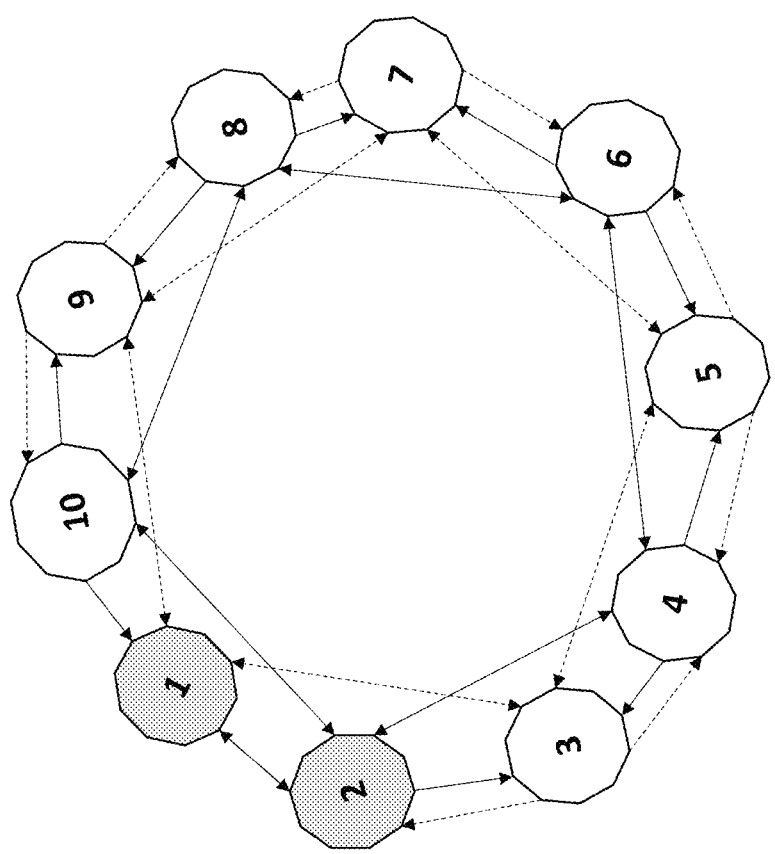
FIG. 4 is a diagram depicting exemplary propagation of data in a network.

In the example shown in FIG. 4, for the communication path in the counterclockwise direction, node 3 is configured to compare the data stream received on the near link from node 2 and the data stream received on the skip link from node 1. If no data is received from node 1 over the skip link, then node 3 does not relay any data in the counterclockwise direction. If data is received from node 1 over the skip link, node 3 is configured to perform a counterclockwise relay of the data stream received from node 1 via the skip link to node 5 via a skip link and to node 4 via a near link. In some examples, if the data received from node 2 matches the data received from node 1, node 3 does not increment the hop count at the end of the data stream that is relayed to node 5. However, if the data received from node 2 does not match the data received from node 1 (different data or no data from node 2), then node 3 increments the hop count by 2 at the end of the data stream that is relayed to node 5.

Similarly, in the example shown in FIG. 4, for the communication path in the clockwise direction, node 3 is configured to compare the data stream received on the near link from node 4 and the data stream received on the skip link from node 5. If no data is received from node 5 over the skip link, then node 3 does not relay any data in the clockwise direction. If data is received from node 5 over the skip link, node 3 is configured to perform a clockwise relay of the data stream received from node 5 via the skip link to node 1 via a skip link and to node 2 via a near link. In some examples, if the data received from node 4 matches the data received from node 5, node 3 does not increment the hop count at the end of the data stream that is relayed to node 1. However, if the data received from node 4 does not match the data received from node 5 (different data or no data from node 4), then node 3 increments the hop count by 2 at the end of the data stream that is relayed to node 1.

In some examples, the self-checking pair and the other nodes in the network effectively implement an "atomic broadcast" where all hop counts represent a hop count of zero leaving the nodes so long as a fault (missing data from skip link or mismatched data) is not detected. The atomic (meaning indivisible) characteristic also means that if any of the nodes don't agree that the two self-checking pair nodes are sending identical data on all their links, all nodes work at modifying the transmission as described in the following paragraphs.

In some examples, the relay nodes are also configured to determine whether the hop count is greater than or equal to a threshold and terminate transmission if this condition is met. In some examples, the threshold is 128, which is the threshold to avoid a rollover or overflow scenario for a 7-bit hop count field.

Each node of the self-checking pair also compares the data stream that it initially sent to the nodes adjacent to the self-checking pair to the data stream it receives on a skip link from a node on the opposite side of the communication network. If the data stream received from the other node does not match the data stream the self-checking pair node sent, then the transmission for the communication system is terminated for that timeslot. For example, if the data stream that node 1 receives from node 9 via a skip link does not match the initial data stream sent by node 1, then node 1 will terminate transmission for that timeslot. Similarly, if the data stream that node 2 receives from node 4 via a skip link does not match the initial data stream sent by node 2, then node 2 will terminate transmission for that timeslot.

When cut-through flooding propagation is used, the delay through each node is minimal, only a byte or a few bits (or even a fraction of a bit on some networks) of delay for each node. Thus, the delay for a data stream to circumnavigate the ring is negligible with respect to the time it takes to transfer all the bits in a data stream. It should be noted that, when using cut-through flooding propagation, the communication among the nodes of the self-checking pair and the other nodes of the communication network can occur simultaneously as well as the comparison by the nodes of the self-checking pair and/or other nodes of the communication network. In particular, the nodes of the self-checking pair or any other nodes in the braided ring network can compare the received data from the self-checking pair on the fly on a bit-by-bit basis.

In some examples using cut-through flooding propagation, the nodes are configured to prevent acceptance of any faulty transmission for a timeslot by indicating to the other nodes of the communication network that a fault is detected. In some examples, the nodes of the communication network are configured to provide the indication to other nodes of the communication network in the hop count field. In such examples, a different frame structure than those used in previous systems can be used.

Figure 5A:
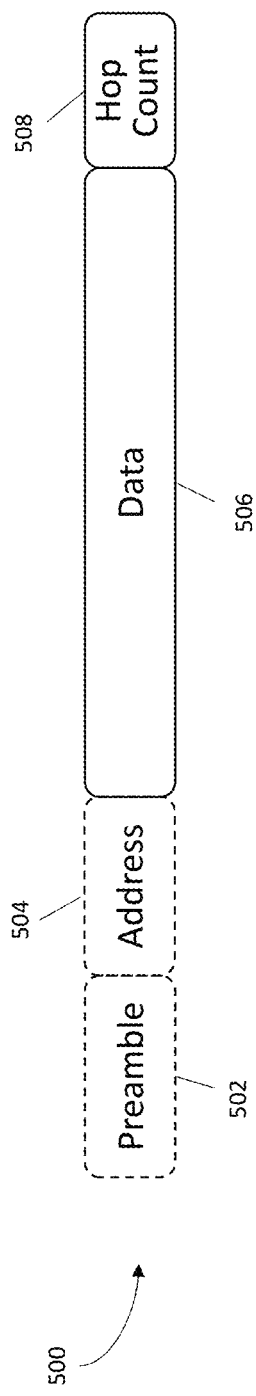
FIGS. 5A-5C are diagrams depicting exemplary frame structures for data communications.

FIG. 5A shows such an example frame 500 that can be used to indicate that a fault is detected. The frame 500 includes data 506 and a hop count field 508 after the data 506. In examples where the frame 500 is for serial communication protocols that have no standard frame or message structure (UART protocol or similar communication protocols), the frame 500 only need include the data 506 and the hop count 508 shown in FIG. 5A. In examples where frame 500 is an Ethernet frame, the frame 500 can further include a preamble 502 and an address field 504 in addition to the data 506 and the hop count field 508. As discussed above, a relay node only increments the hop count if a mismatch between the data streams received in a particular direction is detected. In the example shown in FIG. 5A, the hop count field 508 is positioned at the end of the data stream such that the hop count can be modified after the comparison is performed. In previous systems, the hop count value or hop count field was positioned prior to the data in the data streams, so this technique was not possible.

In other examples using cut-through flooding propagation, an implicit Byzantine agreement scheme can be implemented. In such examples, the data stream circumnavigates the communication path in a particular direction, and then a comparison of the data stream is performed. The member node of the self-checking pair will see the data stream it sent prior to any adjustment of the hop count of the data stream. In some examples, the data stream sent from a member node of the self-checking pair sent in a particular direction is compared to the data stream received in the same direction. In some examples, the member of the self-checking pair compares the data stream it sent to an adjacent node in a particular direction with the data stream it received from a node in the same direction. In some examples, the node adjacent to the member node compares the data stream it initially received from a member of the self-checking pair in a particular direction with the data stream it received in the same direction. By utilizing the member node or the adjacent node, the required additional bandwidth and time to perform the comparison is minimized.

In some examples, a node that is not a member of the self-checking pair and also not the node adjacent to a member node (for example, a node that is two or more hops away from the member node) compares the data stream that it relays in a particular direction with the data stream it receives in the same direction, which can increase the flexibility of the network in that more nodes a capable of performing the comparison. In some examples, multiple nodes (for example, member node and adjacent node) compare the same data stream sent in a particular direction with the data stream received in the same direction after that data stream has completely traversed the braided ring network, which can increase coverage compared to using a single node for the comparison. However, there is a cost of additional bandwidth and time for the data stream to propagate further around the braided ring network on the partial second time around for each of these examples.

Figure 5B:
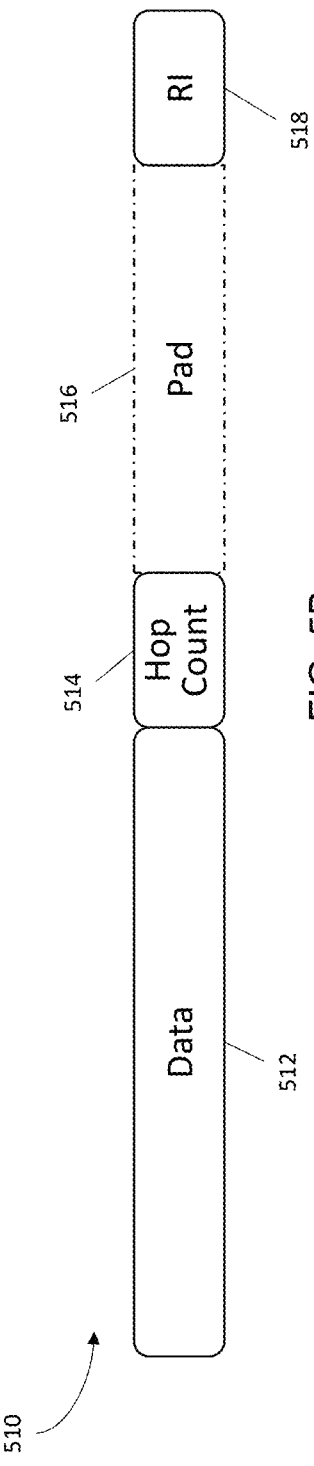
Figure 5C:
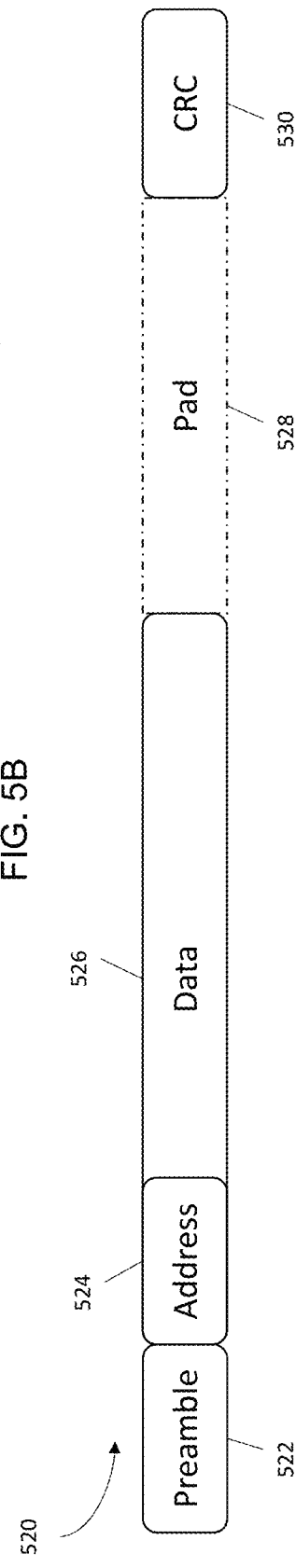

In order for such comparisons to be performed, the data stream needs to be sufficiently long such that the first bits of the data stream circumnavigate the entire ring prior to the last bits being transmitted by the member node of the self-checking pair. FIGS. 5B-5C show example frames (data streams) for different cut-through flooding propagation communication protocols that can be used to ensure that the data stream is sufficiently long for an implicit Byzantine agreement scheme.

FIG. 5B shows an example format of a frame for serial communication protocols that have no standard frame or message structure. In some examples, the frame 510 shown in FIG. 5B could be used for a UART protocol or similar communication protocols. The frame 510 includes data 512, a hop count field 514, padding 516, and a ring integrity flag 518. The padding 516 can be adjusted to modify the size of the data stream. In some examples, the amount of padding can be determined using the node delay, number of nodes in the ring, and the size of the hop count field. In some examples, the amount of padding is equal to the node delay*number of nodes in the ring/2−size of the hop count field+1. After the expected propagation delay around the ring, the members of the self-checking pair or the nodes adjacent to the members of the self-checking pair set the ring-integrity (RI) flag 518 in the tail of the message, if data reconstitution was confirmed. Additional details regarding reconstitution are described in U.S. Pat. No. 8,949,983 (hereinafter the '983 patent), which is hereby incorporated herein by reference.

FIG. 5C shows an example format of an Ethernet frame. The frame 520 includes a preamble 522, address information 524, data 526, padding 528, and a CRC 530. In some examples, the guardian nodes change the preamble in some small way that remains a legal preamble during relaying. This prevents some simple short from bypassing the guardian nodes checking action and being undetected. If any other node makes a change to the preamble, it would be a colluding failure. The padding 528 can be adjusted to modify the size of the data stream. In some examples, the amount of padding can be determined using the node delay, number of nodes in the ring, and the size of the CRC field. In some examples, the amount of padding is equal to the node delay*number of nodes in the ring/2−size of the CRC field+1. After the expected propagation delay around the ring, the members of the self-checking pair or the nodes adjacent to the members of the self-checking pair set a ring-integrity (RI) flag in the tail of the message, if data reconstitution was confirmed. In some examples, loss of integrity can be indicated using truncation (for example, truncation before the data's CRC is propagated). Additional details regarding reconstitution are described in the '983 patent.

When implementing the self-checking pair and the other nodes as discussed above, the nodes in the communication network use a consistent set of criteria for accepting a data stream received by the node. First, it is required that a data stream must be completely received (for example, not truncated as discussed above) in order for it to be accepted. If the protocol includes a tail, the tail must be complete. If a respective node receives a complete data stream, the respective node of the communication network accepts the entire data stream if any six of the following conditions are true:

First Condition: (1) If a data stream is received via the left near port 103-1 and the left skip port 103-2; and (2) the data streams are identical.

Second Condition: (1) If a data stream is received via the right near port 103-3 and the right skip port 103-4; and (2) the data streams are identical.

Third Condition: (1) If a data stream is received via the left near port 103-1 and the right near port 103-3; (2) the data streams are identical except for hop count; and (3) the sum of the hop counts is less than N (for near neighbor self-checking pairs) or N−2 (for skip neighbor self-checking pairs).

Fourth Condition: (1) If a data stream is received via the left near port 103-1 and the right skip port 103-4; (2) the data streams are identical except for hop count; and (3) the sum of the hop counts is less than N (for near neighbor self-checking pairs) or N−2 (for skip neighbor self-checking pairs).

Fifth Condition: (1) If a data stream is received via the left skip port 103-2 and the right near port 103-3; (2) the data streams are identical except for hop count; and (3)

the sum of the hop counts is less than N (for near neighbor self-checking pairs) or N−2 (for skip neighbor self-checking pairs).

Sixth Condition: (1) If a data stream is received via the left skip port 103-2 and the right skip port 103-4; (2) the data streams are identical except for hop count; and (3) the sum of the hop counts is less than N (for near neighbor self-checking pairs) or N−2 (for skip neighbor self-checking pairs).

Store-and-Forward Propagation

Figure 6:
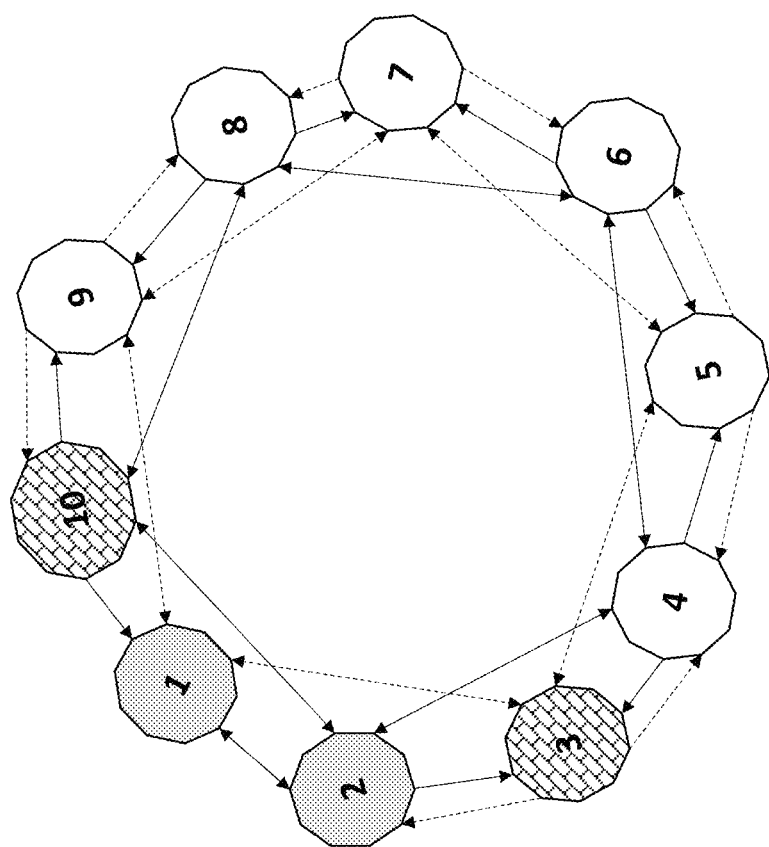
FIG. 6 is a diagram depicting exemplary propagation of data in a network.

In some examples, the communication network shown in FIG. 6 uses store-and-forward message propagation, which includes message buffering in the message propagation path. In such examples, the delay through each node is longer compared to the cut-through propagation since the full message must be received before it can be forwarded at each relaying node. In the examples where store-and-forward message propagation is used, the message is time stamped when it is received by each respective node and a message is time stamped when it is sent by the respective node. In addition, the residence time at the node (difference between time stamps) is added to the outgoing message to accurately capture the total delay for the particular path. In some examples, the communication system utilizes precise synchronization techniques as described in the IEEE 1588 standard and management of transparent clocks conforming to the IEEE 1588 standard, which is incorporated herein by reference. By keeping track of the delay in this manner, a self-checking pair and its guardians can ensure that the correct data is compared for its messages. Similarly, each other node in the ring can compare data received on its four ports to ensure that that the correct data is compared when checking that no errors have entered the data while in transit.

Each member of the self-checking pair, in this example nodes 1 and 2, is configured to operate in a similar manner. In the example shown in FIG. 6, the members of the self-checking pair are near neighbors (connected via a near link). For ease of description, the operation of the communication network will be described when nodes 1 and 2 are the members of the self-checking pair. However, it should be understood that other combinations of nodes could also form a self-checking pair (for example, as described above) and the concepts described herein are generally applicable to other combinations for a self-checking pair. In examples where the nodes of the self-checking pair are not adjacent (such as, for example, the pair shown in FIG. 3C), the node in between the two members of the self-checking pair is configured to form a virtual pair with each member of the self-checking node for the broadcast prior to the timeslot where the self-checking pair is scheduled to broadcast.

In some examples, the nodes of the self-checking pair (nodes 1 and 2 in FIG. 6) operate in a manner similar (rendezvous, message termination, delay time) to that described above prior to transmitting messages. After the delay time, each node of the self-checking pair proceeds with transmitting messages to both of the guardian nodes. In particular, each node of the self-checking pair transmits an identical message to each guardian node. In this example, node 3 and node 10 are the guardian nodes (identified with brick pattern in FIG. 6). In this example, node 2 transmits a message to node 3 via a near link and transmits the message to node 10 via a skip link. Similarly, node 1 transmits a message to node 3 via a skip link and transmits the message to node 10 via a near link. These data transmissions from nodes 1 and 2 take place simultaneously.

Guardian node 3 is configured to relay the message received from node 1 via a skip link to node 5 via a skip link and guardian node 10 is configured to relay the message received from node 2 to node 8 via a skip link. In the example shown in FIG. 6, nodes 4-9 operate as relay nodes and their operation is depicted. In this example, node 4 is configured to relay the message received from node 2 via a skip link to node 6 via a skip link and to node 5 via a near link. In the other direction, node 4 is configured to relay the message received from node 6 via the skip link to node 2 via a skip link and to node 3 via a near link. The other relay nodes operate in a similar manner.

Each guardian node is configured to compare the messages received from the members of the self-checking pair with each other. In this example, guardian node 3 is configured to compare the message received on the near link from node 2 and the message received on the skip link from node 1. Similarly, guardian node 10 is configured to compare the message received on the near link from node 1 and the message received on the skip link from node 2. If the message received from node 1 matches the message received from node 2, then the guardian nodes confirm inline integrity.

In some examples, each guardian node is further configured to wait for a message to circumnavigate the communication path in a particular direction, and then perform an additional comparison with that message to confirm ring integrity. In some examples, the message relayed by the guardian node in a particular direction is compared to the message received by the guardian node in the same direction. In some examples, each guardian node compares the message it initially received from a member of the self-checking pair in a particular direction with the message it received in the same direction after the expected propagation delay around the ring.

For examples using store-and-forward propagation, an entire message must be received before it can be compared, so it is not possible to modify the hop count in the message to indicate integrity of the data from the self-checking pair as part of an atomic broadcast like the cut-through implementation discussed above. Instead, for store-and-forward propagation, a non-atomic broadcast is used where the guardian nodes are configured to send a separate affirmation message to the other nodes of the braided ring network. In some examples, the guardian nodes are configured to send an affirmation message only when inline integrity and ring integrity are confirmed. In some examples, each guardian node forms a transient pair (formed to transfer protocol metadata rather than client message content) with the nearest member of the self-checking pair to send the affirmation message in a self-checking pair fashion.

When implementing the self-checking pair and guardian nodes as discussed above with respect to the store-and-forward message propagation technique, the nodes in the communication network use a consistent set of criteria for accepting a message received by the node. First, it is required that the affirmation message must be received in order for a message to be accepted. In some examples, the time stamps (for example, IEEE 1588 time stamps) of the messages are compared, and the accumulated delay is processed, which aids in ensuring that the messages are bounded with respect to a single transmission time window. If a respective node receives both the initial message and the affirmation message (and if the time stamps and accumulated delay are acceptable), the respective node of the communication network accepts the initial message.

In some store-and-forward message propagation examples, the communication network 100 includes only commercial off-the-shelf (COTS) components for hardware and software. In such examples, a strategy is needed for enforcing the four independent paths around the braided ring when using only COTS components and such strategy would preferably avoid resorting to the use of broadcast or multicast mechanisms in the underlying (standard) protocols (for example, Ethernet), which often are complex, inefficient, and/or have restricted capabilities.

In some examples, each node of the self-checking pair is configured to transmit using static destination addresses unique to the sending node and there is a total of four addresses for the paired transmissions for each self-checking pair. Since the self-checking pair nodes transmit in both directions, each self-checking pair node has two destination addresses, one for each direction. In some examples, the address is a function of the node ID (for example, the node ID can be even or odd). In some examples, the destination address of a message is selected to be the opposite side of the sending node or the opposite side of an adjacent neighbor node. By selecting the destination addresses accordingly, it is guaranteed that the destinations can only be reached by fully traversing the ring.

In some examples, the COTS routing configuration in each node is set up using destination addresses such that the messages are routed from the ports on one side of the node to the ports on the other side of the node. In some examples, the nodes relay messages received from the skip link to the opposite side skip link, which maintains direction flow through the communication network without U-turns. For example, a node performing a clockwise relay would receive a message via the left skip port and forward that message via the right skip port and a node performing a counterclockwise relay would receive a message via the right skip port and forward that message via the left skip port. This routing scheme effectively creates two lanes of traffic where one lane of traffic goes through odd-numbered nodes in FIG. 6 and the other lane of traffic goes through even-numbered nodes in FIG. 6, starting from the original sending node (member of the self-checking pair). The addressing enforcement ensures lanes are not crossed and the desired routing occurs throughout the communication network.

For high-integrity messages, the receiving node needs to receive four copies of the message to perform the required data qualifications. Each node saves a copy of every message it receives, so the near neighbors of a receiving node that needs to consume a high-integrity message each send a copy of the messages received on the skip link out their near link to the receiving node. In some examples, high-integrity messages that need to be received at a certain node are forwarded by software to the near link as a second-stage broadcast. In some examples, the second-stage broadcast via the near link can occur when the initial message is being relayed via the skip link. For networks that mix redundant and nonredundant message paths, redundant and nonredundant messages can use standard destination addressing, possibly adding content (buffer) addressing to the destination address.

The configurations described above guarantee that all good nodes (for example, non-faulty nodes) will receive the same message when there are any two non-colluding failures. Additional details regarding comparisons and actions of self-checking pairs in which both nodes source the data are described in the '859 patent. Additional details regarding comparisons and actions of virtual self-checking pairs in which only one node sources the data are described in the '675 patent.

Figure 7:
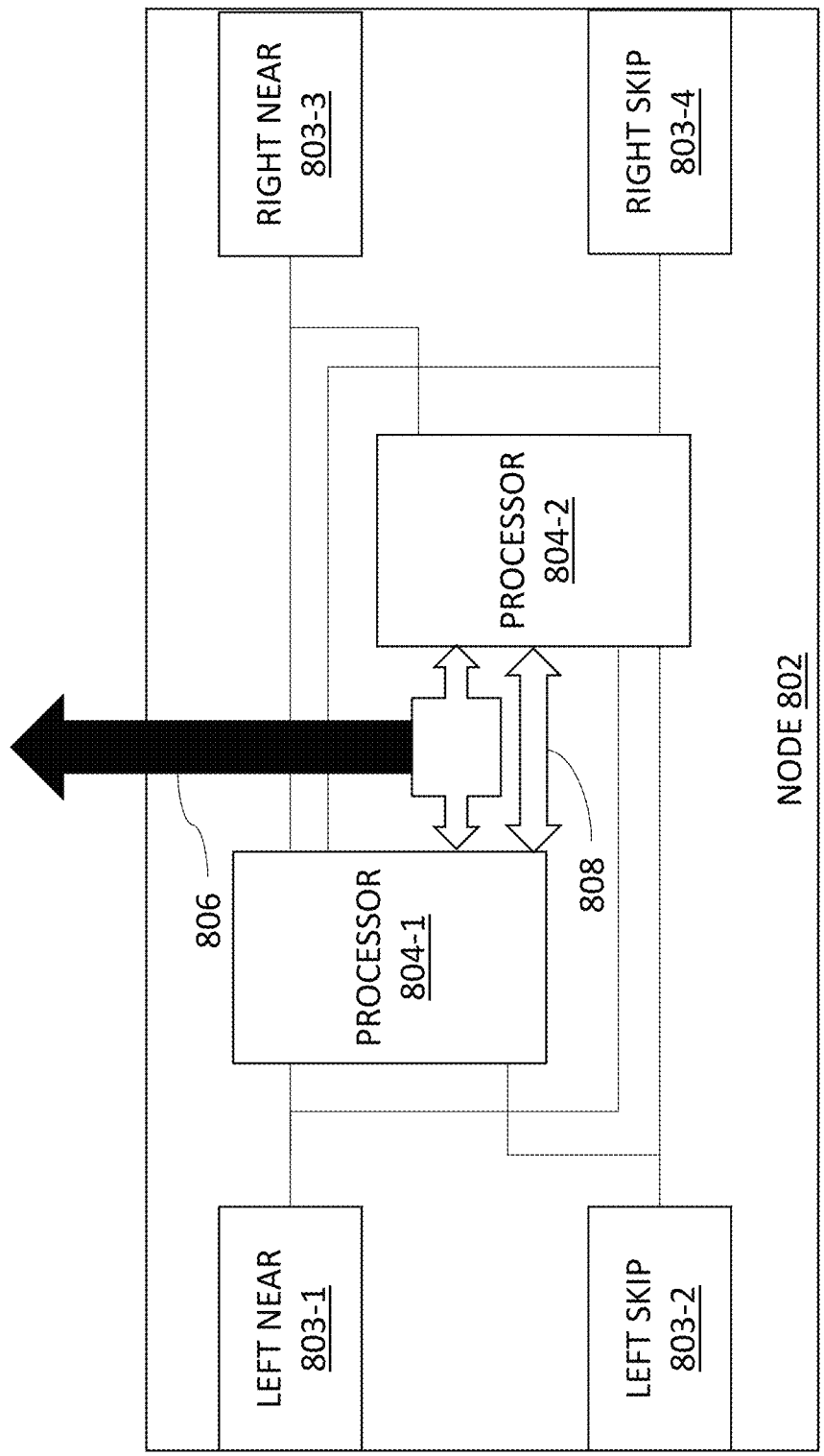
FIG. 7 is a block diagram of an example of a self-checking communication node.

FIG. 7 is a block diagram of an exemplary self-checking node 802 that can be implemented in a communication network such as network 100 above. Node 802 includes processors 804-1, 804-2, a plurality of ports 803, and a local input/output (I/O) 806. It is to be understood that in some examples, the links coupling the node 802 to other nodes are implemented using full-duplex bi-directional links and, in other examples, the links are implemented using half-duplex bi-directional links. In addition, as used herein, the term "communicating data" refers to either transmitting data or relaying data, whereas "transmitting" refers to outputting data that is sourced at the node 802 and "relaying" refers to outputting data that is sourced from another node and received at node 802.

Node 802 includes a left near port 803-1 configured to receive data in the clockwise direction 110 from a left near neighbor node adjacent to the node 802, where the left near neighbor node is positioned counterclockwise compared to the node 802 in the braided ring communication network 100. The left near port 803-1 also is configured to send data to the left near neighbor node in the counterclockwise direction 112 via the left near link.

Node 802 also includes a left skip port 803-2 configured to receive data in the clockwise direction 110 from a left skip neighbor node, where the left skip neighbor node is positioned counterclockwise compared to the node 802 in the braided ring communication network 100. The left skip port 803-2 also is configured to send data to the left skip neighbor node in the counterclockwise direction 112 via the left skip link.

Node 802 also includes a right near port 803-3 configured to receive data in the counterclockwise direction 112 from a right near neighbor node adjacent to the node 802, where the right near neighbor node is positioned clockwise compared to the node 802 in the braided ring communication network 100. The right near port 803-3 also is configured to send data to the right near neighbor node in the clockwise direction 110 via the right near link.

Node 802 also includes a right skip port 803-4 configured to receive data in the counterclockwise direction 112 from a right skip neighbor node, where the right skip neighbor node is positioned clockwise compared to the node 802 in the braided ring communication network 100. The right skip port 803-4 also is configured to send data to the second skip neighbor node in the clockwise direction 110 via the right skip link.

In some examples, the processors 804-1, 804-2 of the self-checking node 802 can be used as a high-integrity pair. In some examples, the processors 804-1, 804-2 implement asymmetric transmissions, where processor 804-1 transmits via a skip port in a first direction and a near port in the second direction and where processor 804-2 transmits on the skip port in the second direction and the near link in the first direction. In some examples, the processor 804-1 can transmit on the left near port 803-1 and the right skip port 803-4 and the processor 804-2 can transmit on the left skip port 803-2 and the right near port 803-3. In other examples, the processor 804-2 can transmit on the left near port 803-1 and the right skip port 803-4 and the processor 804-1 can transmit on the left skip port 803-2 and the right near port 803-3. Both processors 804-1, 804-2 are configured to receive via all four ports 803. The congruency exchange 808 for the processors 804-1, 804-2 is more extensive than for node 102 shown in FIG. 2, but the software for implementing a self-checking pair can be less complex as it is on one node.

In some examples, the processors 804-1 and 804-2 are configurable to communicate with one of the first neighbor node or the second neighbor node to form a self-checking pair. When the node 802 sources data to be transmitted to other nodes of the network, the processors 804-1, 804-2 determine when to form a self-checking pair with one of the first near neighbor node or the second near neighbor node. In some examples, the processors 804-1, 804-2 analyze a transmission schedule to determine when to form a self-checking pair and with which near neighbor to form the pair. In some such examples, the processors 804-1, 804-2 rendezvous with the other near neighbor node and direct the transmission of the data being sourced by the node 802 to the other near neighbor node forming the self-checking pair prior to, or concurrently with, a scheduled timeslot in which the node 802 is to transmit the data to the other nodes of the network.

In some examples, the node 802 acts as a simplex source for data. In such examples, the network has a priori knowledge that the self-checking node alone is sending the paired broadcast. In such examples, the hop count validation discussed above is valid when the hop count is less than N. In other examples, the node 802 forms a virtual self-checking pair with each of its neighbors for a paired broadcast. In such examples, the hop count validation discussed above is valid when the hop count is less than N.

For high-integrity propagation, neighboring nodes may forward the data received on the near link facing the high-integrity pair node 802. To simplify the logistics, the high-integrity node 802 can be configured to transmit the message using an address that maps to the paired neighbor. For this specific address, the neighbor would forward the message on the skip link in the downstream direction. In such examples, the separation of lanes (odd-numbered and even-numbered) would be policed by the neighbor node, so the transmission would be dropped if the paired node is odd and the high-integrity node 802 transmits with an address mapped to an even node.

Figure 8:
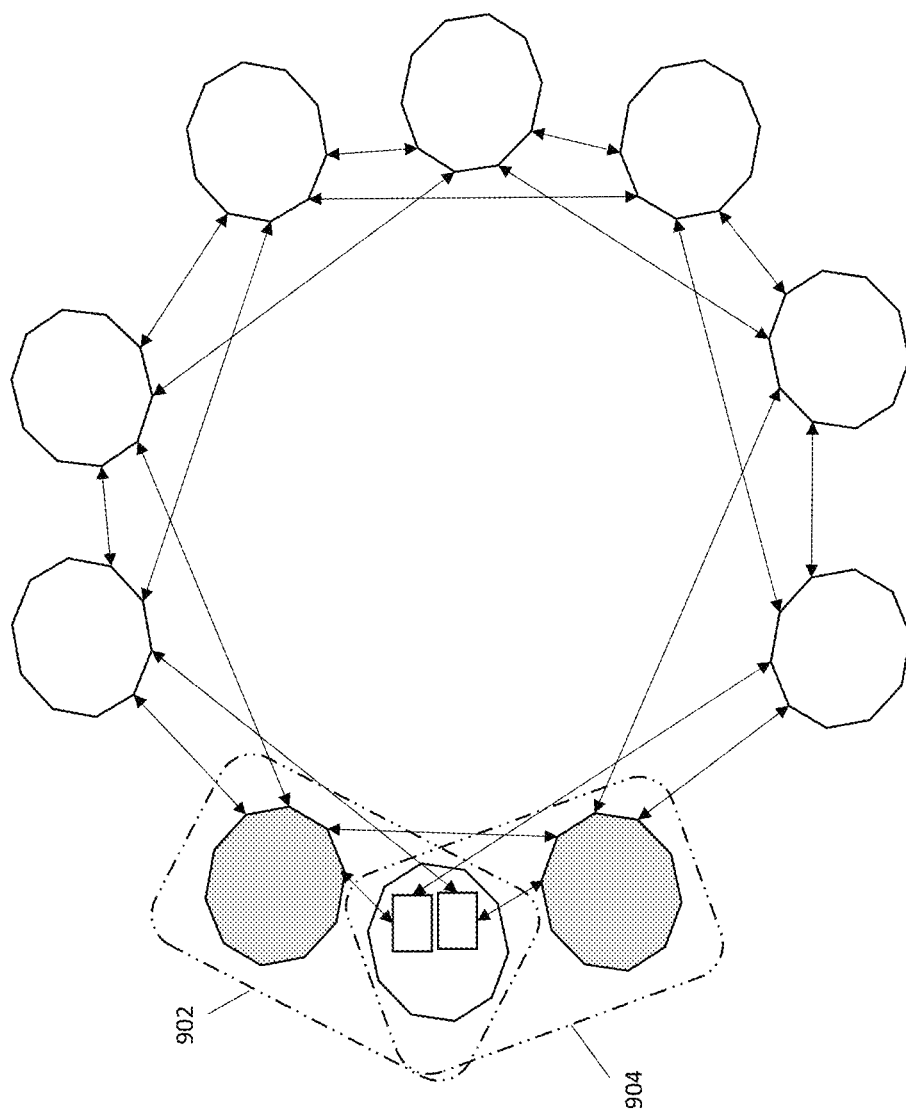
FIG. 8 is a diagram depicting exemplary propagation of data in a network.

The other techniques discussed above are also applicable to the self-checking node 802 and the self-checking pairs 902, 904 between the self-checking node 802 and its neighbor nodes shown in FIG. 8.

Figure 9:
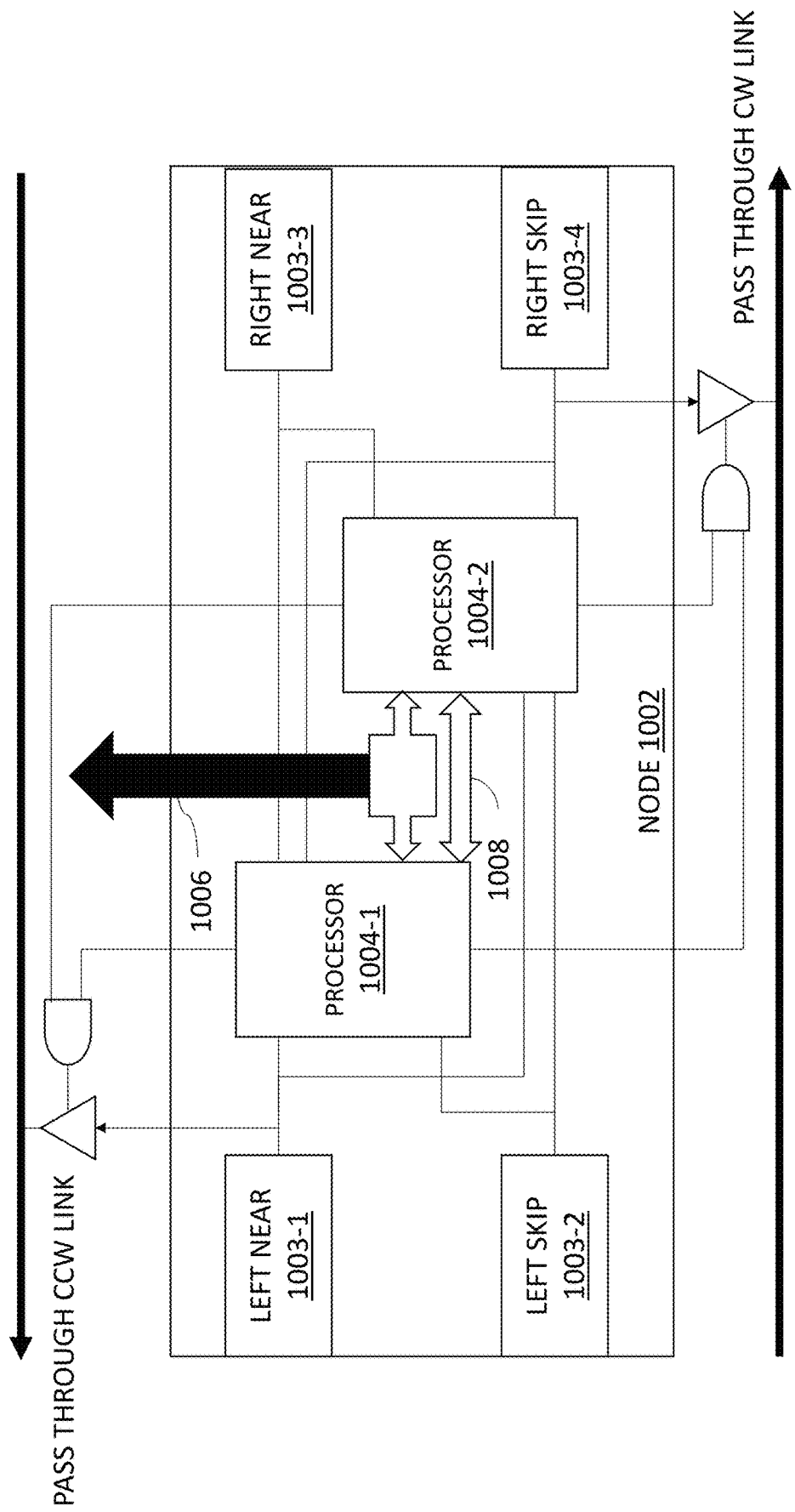
FIG. 9 is a block diagram of an example of a self-checking communication node.

In some examples, it may be desirable to avoid having the self-checking node form a virtual pair with each of its neighbors for a paired broadcast as discussed above. FIG. 9 is a block diagram of an alternative self-checking node 1002 that can be implemented in a communication network such as network 100 above. The functions, structures, and other description of common elements of the self-checking node 802 discussed above with respect to FIG. 7 are also applicable to like named features in self-checking node 1002 shown in FIG. 9 and vice versa. Further, like named features included in FIGS. 7 and 9 are numbered similarly. The description of FIG. 9 will focus on the differences from FIG. 7.

In some examples, the processors 1004-1, 1004-2 are configured to drive pass-through links such that the segment would become a 3-way bus. In particular, the processors 1004-1, 1004-2 are configured to drive the pass-through CCW link and the pass-through CW link via respective AND enable mechanisms as shown in FIG. 9. During self-checking slots, the node 1002 would appear on both skip and direct links of the adjacent nodes as a regular self-checking broadcast. The mechanism shown in FIG. 9 avoids having to modify data propagation rules for the self-checking node 1002 broadcast and forwarding of the data to the adjacent nodes as discussed above with respect to FIGS. 7-8 would not be required. In some examples, the communication network is configured to implement local monitoring and rate restriction of the AND enable mechanism in order to reduce the likelihood of a "malicious" half of the pair (processor 1004-1 or processor 1004-2) from modulating a bad signal. In some examples, the monitoring can be accomplished by each half of the pair (processor 1004-1 and processor 1004-2) looking at the outputs of the two AND gates and disabling its respective input to an AND gate if that AND gate's output doesn't conform to an implementation specific set of rules, such as, for example, a minimum time between signal changes. While the above description and FIG. 9 imply a three-state driver connected to the pass-through links, it should be understood that any equivalent circuit known in the art could alternatively be used (for example, using multiplexers instead of three-state drivers).

In various aspects, system elements, method steps, or examples described throughout this disclosure (such as the nodes 102, node 802, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used for synchronization and fault management in a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Example Embodiments

Example 1 includes a node in a network, comprising: a first port communicatively coupled to a first node via a first near link; a second port communicatively coupled to a second node via a first skip link; a third port communicatively coupled to a third node via a second near link; a fourth port communicatively coupled to a fourth node via a second skip link; at least one processor configured to: compare a first data stream received from the first node in a first direction with a second data stream received from the second node in the first direction, wherein the first data stream and the second data stream are sourced from a self-checking pair of nodes in the network; compare a third data stream received from the third node in a second direction with a fourth data stream received from the fourth node in the second direction, wherein the third data stream and the stream data stream are sourced from the self-checking pair of nodes in the network; relay the second data stream to the third node and the fourth node in the first direction and a hop count at the end of the second data stream that is indicative of integrity of the second data stream; and relay the fourth data stream to the first node and the second node in the second direction and a hop count at the end of the fourth data stream that is indicative of integrity of the fourth data stream.

Example 2 includes the node of Example 1, wherein the node is further configured to modify the hop count at the end of the second data stream in response to: a mismatch between the first data stream and the second data stream; or a received hop count greater than zero.

Example 3 includes the node of any of Examples 1-2, wherein the node is further configured to modify the hop count at the end of the fourth data stream in response to: a mismatch between the third data stream and the fourth data stream; or a received hop count greater than zero.

Example 4 includes the node of any of Examples 1-3, wherein the node is further configured to: compare the first data stream with the third data stream and the fourth data stream; accept the first data stream in response to: the first data stream matching the third data stream except for hop count and a sum of the hop count of the first data stream and the hop count of the third data stream being less than a threshold value; or the first data stream matching the fourth data stream except for hop count and the sum of the hop count of the first data stream and the hop count of the fourth data stream being less than the threshold value; compare the second data stream with the third data stream and the fourth data stream; and accept the second data stream in response to: the second data stream matching the third data stream except for hop count and a sum of the hop count of the second data stream and the hop count of the third data stream being less than the threshold value; or the second data stream matching the fourth data stream except for hop count and the sum of the hop count of the second data stream and the hop count of the fourth data stream being less than the threshold value.

Example 5 includes the node of Example 4, wherein the threshold value is N when the self-checking pair of nodes in the network are adjacent to each other, where N is a total amount of nodes in the network.

Example 6 includes the node of Example 4, wherein the threshold value is N−2 when the self-checking pair of nodes in the network are not adjacent to each other, where N is a total amount of nodes in the network.

Example 7 includes the node of any of Examples 1-6, wherein the network is a braided ring network.

Example 8 includes a network, comprising: a plurality of nodes; and a plurality of communication links communicatively coupling each of the plurality of nodes to at least one respective adjacent node of the plurality of nodes via a first communication path in a first direction and to another respective adjacent node of the plurality of nodes via a second communication path in a second direction, wherein the plurality of nodes and the plurality of communication links have a topology where the network includes disjoint communication paths; wherein a first node and a second node of the plurality of nodes are configured to form a self-checking pair, wherein the first node and the second node are adjacent nodes or separated by a single node; wherein each node of the plurality of nodes is configured to: compare a first data stream received via a near link in the first direction with a second data stream received via a skip link in the first direction, wherein the first data stream and the second data stream are sourced from the self-checking pair in the network; compare a third data stream received via a near link in the second direction with a fourth data stream received via a skip link in the second direction, wherein the third data stream and the fourth data stream are sourced from the self-checking pair in the network; relay the second data stream and a hop count at the end of the second data stream that is indicative of integrity of the second data stream in the first direction via a skip link; and relay the fourth data stream and a hop count at the end of the fourth data stream that is indicative of integrity of the fourth data stream in the second direction via a skip link.

Example 9 includes the network of Example 8, wherein the plurality of communication links comprises: a first plurality of communication links communicatively coupling each of the plurality of nodes to a respective adjacent node on the first communication path and a respective adjacent node on the second communication path; and a second plurality of communication links communicatively coupling each of the plurality of nodes to a respective skip node on the first communication path and a respective skip node on the second communication path.

Example 10 includes the network of Example 9, wherein the second plurality of communication links are configured to communicate using a higher bandwidth or bit rate than the first plurality of communication links.

Example 11 includes the network of any of Examples 8-10, wherein the first node and the second node of the plurality of nodes form either: a real self-checking pair where both the first node and the second node are source nodes; or a virtual self-checking pair where only the first node is a source node.

Example 12 includes the network of any of Examples 8-11, wherein at least one node of plurality of nodes is configured to modify the hop count at the end of the second data stream that is indicative of integrity of the second data stream in response to: a mismatch between the first data stream and the second data stream; or a received hop count greater than zero.

Example 13 includes the network of any of Examples 8-12, wherein at least one node of plurality of nodes is configured to modify the hop count at the end of the fourth data stream that is indicative of integrity of the fourth data stream in response to: a mismatch between the third data stream and the fourth data stream; or a received hop count greater than zero.

Example 14 includes the network of any of Examples 8-13, wherein each node of the plurality of nodes is further configured to: compare the first data stream with the third data stream and the fourth data stream; accept the first data stream in response to: the first data stream matching the third data stream except for hop count and a sum of the hop count of the first data stream and the hop count of the third data stream being less than a threshold value; or the first data stream matching the fourth data stream except for hop count and the sum of the hop count of the first data stream and the hop count of the fourth data stream being less than the threshold value; compare the second data stream with the third data stream and the fourth data stream; and accept the second data stream in response to: the second data stream matching the third data stream except for hop count and a sum of the hop count of the second data stream and the hop count of the third data stream being less than the threshold value; or the second data stream matching the fourth data stream except for hop count and the sum of the hop count of the second data stream and the hop count of the fourth data stream being less than the threshold value.

Example 15 includes the network of Example 14, wherein the threshold value is N−1 when the self-checking pair of nodes in the network are adjacent to each other, wherein the threshold value is N−2 when the self-checking pair of nodes in the network are not adjacent to each other, where N is a total amount of nodes in the network.

Example 16 includes the network of any of Examples 8-15, wherein the plurality of nodes and the plurality of communication links have a braided ring topology.

Example 17 includes a network comprising: a plurality of nodes; and a plurality of links communicatively coupling each of the plurality of nodes to at least one respective adjacent node of the plurality of nodes via a first communication path in a first direction and to another respective adjacent node of the plurality of nodes via a second communication path in a second direction; wherein a first node and a second node of the plurality of nodes are configured to form a self-checking pair, wherein the first node and the second node are adjacent nodes or separated by a single node, wherein the first node is configured to transmit a first message in the first direction and in the second direction as part of a paired broadcast, wherein the second node is configured to transmit a second message in the first direction and in the second direction as part of a paired broadcast; wherein a third node is adjacent to the first node, wherein the third node is configured to: compare the first message received from the first node in a first direction via a near link with the second message received from the second node in the first direction via a skip link; and relay the second message in the first direction via a skip link with a self-affirmation message only if the first message matches the second message; wherein a fourth node is adjacent to the second node, wherein the fourth node is configured to: compare the first message received from the first node in the second direction via a skip link with the second message received from the second node in the second direction via a near link; and relay the first message in the second direction via a skip link with a self-affirmation message only if the first message matches the second message.

Example 18 includes the network of Example 17, wherein the third node is further configured to: wait for a message to circumnavigate the first communication path in the first direction; compare the message that circumnavigated the first communication path in the first direction with the second message; and relay the second message in the first direction via a skip link with a self-affirmation message only if the message that circumnavigated the first communication path in the first direction matches the second message; wherein the fourth node is further configured to: wait for a message to circumnavigate the second communication path in the second direction; compare the message that circumnavigated the second communication path in the second direction with the first message; and relay the first message in the second direction via a skip link with a self-affirmation message only if the message that circumnavigated the second communication path in the second direction matches the first message.

Example 19 includes the network of any of Examples 17-18, wherein the third node is configured to form a transient pair with the first node to send the self-affirmation message, wherein the fourth node is configured to form a transient with the second node to send the self-affirmation message.

Example 20 includes the network of any of Examples 17-19, wherein the plurality of nodes and the plurality of links have a braided ring topology.

Example 21 includes a network comprising: a plurality of nodes; and a plurality of communication links communicatively coupling each of the plurality of nodes to at least one respective adjacent node of the plurality of nodes via a first communication path in a first direction and to another respective adjacent node of the plurality of nodes via a second communication path in a second direction; wherein a first node and a second node of the plurality of nodes are configured to form a self-checking pair, wherein the first node and the second node are adjacent nodes or separated by a single node; wherein the first node of the plurality of nodes is configured to: send a first message in the first direction via a first side of the first node, wherein the first message includes a first destination address that corresponds to a second side of the first node opposite the first side of the first node; send a second message in the second direction via the second side of the first node, wherein the second message includes a second destination address that corresponds to the first side of the first node; wherein the second node of the plurality of nodes is configured to: send a third message in the first direction via a first side of the second node, wherein the third message includes a third destination address that corresponds to a second side of the second node opposite the first side of the second node; send a fourth message in the second direction via the second side of the second node, wherein the fourth message includes a fourth destination address that corresponds to the first side of the second node.

Example 22 includes the network of Example 21, wherein each node of the plurality of nodes is configured to: relay messages in the first direction to another node of the plurality of nodes via a respective first skip port, wherein only messages received via a respective second skip port are relayed in the first direction; and relay messages in the second direction to another node of the plurality of nodes via the respective second skip port, wherein only messages received via the respective first skip port are relayed in the second direction.

Example 23 includes the network of any of Examples 21-22, wherein each node of the plurality of nodes is configured to save a copy of each message received by that node in the first direction and save a copy of each message received by that node in the second direction.

Example 24 includes the network of Example 23, wherein each node of the plurality of nodes is configured to send the copy of a message received by that node to an adjacent node via a near port when the adjacent node is scheduled to consume a high-integrity message.

Example 25 includes the network of Example 24, wherein each node of the plurality of nodes is configured to send the copy of a message received by that node to the adjacent node via the near port as a second-stage broadcast that is separate from relaying messages.

Example 26 includes the network of Example 25, wherein each node of the plurality of nodes is configured to send the second-stage broadcast approximately simultaneously with relaying messages.

Example 27 includes the network of any of Examples 21-26, wherein each node of the plurality of nodes is a commercial off-the-shelf component.

Example 28 includes the network of any of Examples 21-27, wherein the plurality of communication links comprises: a first plurality of communication links communicatively coupling each of the plurality of nodes to a respective adjacent node on the first communication path of the network and a respective adjacent node on the second communication path of the network; and a second plurality of communication links communicatively coupling each of the plurality of nodes to a respective skip node on the first communication path of the network and a respective skip node on the second communication path of the network.

Example 29 includes the network of Example 28, wherein the second plurality of communication links are configured to communicate using a higher bandwidth or bit rate than the first plurality of communication links.

Example 30 includes the network of any of Examples 28-29, wherein each node of the plurality of nodes is configured to send a copy of high-integrity messages via the first plurality of communication links, wherein each node of the plurality of nodes is configured to relay communications via the second plurality of communication links.

Example 31 includes the network of any of Examples 21-30, wherein the plurality of nodes and the plurality of communication links have a braided ring topology Example 32 includes a node in a network, comprising: a first port configured to be coupled to a first node via a first near link; a second port configured to be coupled to a second node via a first skip link, wherein the first port and the second port are positioned on a first side of the node; a third port configured to be coupled to a third node via a second near link; a fourth port configured to be coupled to a fourth node via a second skip link, wherein the third port and the fourth port are positioned on a second side of the node opposite the first side; at least one processor configured to: send a first message in a first direction via the second port, wherein the first message includes a first destination address that corresponds to the second side of the node; send a second message in a second direction via the fourth port, wherein the second message includes a second destination address that corresponds to the first side of the node.

Example 33 includes the node of Example 32, wherein the at least one processor is configured to: relay messages in the first direction to the second node via the second port, wherein only messages received via the fourth port are relayed in the first direction; and relay messages in the second direction to the fourth node via the fourth port, wherein only messages received via the second port are relayed in the second direction.

Example 34 includes the node of any of Examples 32-33, wherein the at least one processor is configured to: save a copy of messages received via the second port; save a copy of messages received via the fourth port; send the copy of messages received via the second port to the third node via the third port when the third node is scheduled to consume a high-integrity message; and send the copy of messages received via the fourth port to the first node via the first port when the first node is scheduled to consume a high-integrity message.

Example 35 includes the node of Example 34, wherein the at least one processor is configured to send the copy of the messages received via the second port and the copy of messages received via the fourth port as a second-stage broadcast.

Example 36 includes the node of Example 35, wherein the at least one processor is configured to send the second-stage broadcast approximately simultaneously with relaying messages.

Example 37 includes the node of any of Examples 32-36, wherein the node is a commercial off-the-shelf component.

Example 38 includes the node of any of Examples 32-37, wherein the network has a braided ring topology.

Example 39 includes a method, comprising: sending, with a first node in a network, a first message in a first direction via a first side of the first node, wherein the first message includes a first destination address that corresponds to a second side of the first node opposite the first side of the first node; sending, with the first node, a second message in a second direction via the second side of the first node, wherein the second message includes a second destination address that corresponds to the first side of the first node; sending, with a second node in the network, a third message in the first direction via a first side of the second node, wherein the third message includes a third destination address that corresponds to a second side of the second node opposite the first side of the second node; and sending, with the second node, a fourth message in the second direction via the second side of the second node, wherein the fourth message includes a fourth destination address that corresponds to the first side of the second node.

Example 40 includes the method of Example 39, wherein the network is a braided ring network, further comprising: relaying, with the first node, messages in the first direction to another node via a first skip port of the first node, wherein only messages received via a second skip port of the first node are relayed in the first direction; and relaying, with the first node, messages in the second direction to another node via the second skip port of the first node, wherein only messages received via the first skip port of the first node are relayed in the second direction.

Example 41 includes a method comprising: forming a first self-checking pair including a self-checking node and a first node adjacent to the self-checking node in a network; forming a second self-checking pair including the self-checking node and a second node adjacent to the self-checking node in the network, wherein the self-checking node is positioned between the first node and the second node in the network; transmitting a first paired broadcast with the first self-checking pair; and transmitting a second paired broadcast with the second self-checking pair.

Example 42 includes the method of Example 41, wherein transmitting the first paired broadcast comprises: sending a first communication from a first processor of the self-checking node to the second node; sending the first communication from the first processor of the self-checking node to a third node that is adjacent to the first node in the network, wherein the first node is positioned between the self-checking node and the third node in the network; sending a second communication from the first node to the second node; and sending the second communication from the first node to the third node.

Example 43 includes the method of Example 42, wherein transmitting the second paired broadcast comprises: sending a third communication from a second processor of the self-checking node to the first node; sending the third communication from the second processor of the self-checking node to a fourth node, wherein the second node is positioned between the self-checking node and the fourth node in the network; sending a fourth communication from the second node to the first node; and sending the fourth communication from the second node to the fourth node.

Example 44 includes the method of Example 43, further comprising: stopping transmission of the first communication and the second communication if the first communication from the first processor is not identical to the second communication from the first node; and stopping transmission of the third communication and the fourth communication if the third communication from the second processor is not identical to the fourth communication from the second node.

Example 45 includes the method of Example 44, wherein stopping transmission of the first communication and the second communication comprises modifying a hop count of the first communication and/or the second communication, wherein stopping transmission of the third communication and the fourth communication comprises modifying a hop count of the third communication and/or the fourth communication.

Example 46 includes the method of Examples 42, wherein the first communication is a first data stream that includes an amount of padding such that the first data stream is received by the first processor of the self-checking node prior to completion of the first data stream; wherein the second communication is a second data stream that includes an amount of padding such that the second data stream is received by the first node prior to completion of the second data stream; the method further comprising: stopping, with the first processor of the self-checking node, transmission of the first data stream prior to completion of the first data stream if the first data stream sent to the third node is not identical to the first data stream that is received by the first processor of the self-checking node; and stopping, with the first node, transmission of the second data stream prior to completion of the second data stream if the second data stream sent to the second node is not identical to the second data stream received by the first node.

Example 47 includes the method of Example 46, wherein the network is a braided ring network.

Example 48 includes a network comprising: a plurality of nodes; and a plurality of links communicatively coupling each of the plurality of nodes to at least one respective adjacent node of the plurality of nodes via a first communication path and to another respective adjacent node of the plurality of nodes via a second communication path; wherein a self-checking node and a first node of the plurality of nodes are configured to source data, wherein the self-checking node and the first node are adjacent nodes; wherein the self-checking node is configured to send a first communication to: a second node of the plurality of nodes that is adjacent the self-checking node; and a third node of the plurality of nodes that is adjacent the first node; wherein the first node is configured to send a second communication to the second node and the third node; wherein the self-checking node and the second node of the plurality of nodes are configured to source data; wherein the self-checking node is configured to send a third communication to: the first node; and a fourth node of the plurality of nodes that is adjacent the second node; wherein the second node is configured to send a fourth communication to the first node and the fourth node; wherein at least one node of plurality of nodes is configured to prevent acceptance of the first communication and the second communication when the first communication does not match the second communication; wherein at least one node of plurality of nodes is configured to prevent acceptance of the third communication and the fourth communication when the third communication does not match the fourth communication.

Example 49 includes the network of Example 48, wherein the self-checking node comprises a first processor and a second processor; wherein the first processor of the self-checking node is configured to send the first communication to the second node and to the third node; wherein the second processor of the self-checking node is configured to send the third communication to the first node and the fourth node.

Example 50 includes the network of any of Examples 48-49, wherein the plurality of nodes is configured to send data streams using cut-through flooding propagation, wherein the first communication is a first data stream and the second communication is a second data stream.

Example 51 includes the network of Example 50, wherein the at least one node is configured to modify a hop count of the first data stream and/or the second data stream such that the hop count is invalid.

Example 52 includes the network of any of Examples 50-51, wherein the first data stream includes an amount of padding such that the first data stream is received by the self-checking node prior to completion of the first data stream; and wherein the second data stream includes an amount of padding such that the second data stream is received by the first node prior to completion of the second data stream.

Example 53 includes the network of any of Examples 48-52, wherein the second node is configured to compare the first communication received from the self-checking node to the second communication received from the first node, wherein the second node is configured to prevent acceptance of the first communication and the second communication when the first communication does not match the second communication; and wherein the third node is configured to compare the first communication received from the self-checking node to the second communication received from the first node, wherein the third node is configured to prevent acceptance of the first communication and the second communication when the first communication does not match the second communication.

Example 54 includes the network of any of Examples 48-53, wherein a fourth node different than the second node and the third node is configured to compare the first communication received from the self-checking node to the second communication received from the first node, wherein the fourth node is configured to prevent acceptance of the first communication and the second communication when the first communication does not match the second communication.

Example 55 includes the network of any of Examples 48-54, wherein the network is a braided ring network.

Example 56 includes a self-checking node of a network, comprising: a first near port configured to receive data on a first communication path of the network in a first direction from a first near neighbor node adjacent to the self-checking node, wherein the first near port is configured to send data to the first near neighbor node on a second communication path of the network in a second direction; a first skip port configured to receive data on the first communication path of the network in the first direction from a first skip neighbor node adjacent to the first near neighbor node, wherein the first skip port is configured to send data to the first skip neighbor node on the second communication path of the network in the second direction; a second near port configured to receive data on the second communication path of the network in the second direction from a second near neighbor node adjacent to the self-checking node, wherein the second near port is configured to send data to the second near neighbor node on the first communication path of the network in the first direction; a second skip port configured to receive data on the second communication path of the network in the second direction from a second skip neighbor node adjacent to the second near neighbor node, wherein the second skip port is configured to send data to the second skip neighbor node on the first communication path of the network in the first direction; a first processor configured to transmit data via the first near port and the second skip port; a second processor configured to transmit data via the second near port and the first skip port; wherein the first processor and the second processor are configured to receive data via the first near port, the first skip port, the second near port, and the second skip port.

Example 57 includes the self-checking node of Example 56, wherein the self-checking node is configured to form a first self-checking pair with the second near neighbor node adjacent to the self-checking node in the network, wherein the first self-checking pair is configured to provide a first paired broadcast, wherein the first processor of the self-checking node is configured to transmit for the self-checking node for the first paired broadcast; wherein the self-checking node is configured to form a second self-checking pair with the first near neighbor node adjacent to the self-checking node in the network, wherein the second self-checking pair is configured to provide a second paired broadcast, wherein the second processor of the self-checking node is configured to transmit for the self-checking node for the second paired broadcast.

Example 58 includes the self-checking node of any of Examples 56-57, wherein the first processor is configured to transmit a first communication to the first near neighbor node via the first near port, wherein the first processor is configured to transmit the first communication to the second skip neighbor node via the second skip port; wherein the second processor is configured to transmit a second communication to the second near neighbor node via the second near port, wherein the second processor is configured to transmit the second communication to the first skip neighbor node via the first skip port.

Example 59 includes the self-checking node of Example 58, wherein the first processor and the second processor are further configured to: transmit the first communication to the first near neighbor node by driving a first pass-through link coupled to a skip port of the first near neighbor node; and transmit the second communication to the second near neighbor node by driving a second pass-through link coupled to a skip port of the first near neighbor node.

Example 60 includes the self-checking node of any of Examples 56-59, wherein the network is a braided ring network.

Example 61 includes a method comprising: sending a first data stream from a first member node of a self-checking pair, including the first member node and a second member node, to a third node in a first direction around a braided ring network; sending a second data stream from the second member node of the self-checking pair to a fourth node in a second direction around the braided ring network; stopping, with the first member node or the third node, the transmission of the first data stream prior to completion of the first data stream if the first data stream sent to the third node is not identical to the first data stream that is received by the first member node or the third node; and stopping, with the second member node or the fourth node, the transmission of the second data stream prior to completion of the second data stream if the second data stream sent to the fourth node is not identical to the second data stream received by the second member node or the fourth node.

Example 62 includes the method of Example 61, wherein the third node is adjacent to the self-checking pair in the braided ring network, wherein the first data stream includes an amount of padding such that the first data stream is received by the first member node prior to completion of the first data stream; and wherein the fourth node is adjacent to the self-checking pair in the braided ring network, wherein the second data stream includes an amount of padding such that the second data stream is received by the second member node prior to completion of the second data stream.

Example 63 includes the method of any of Examples 61-62, wherein a frame of the first data stream includes a data field, a hop count field, padding, and a ring integrity flag.

Example 64 includes the method of Example 63, wherein the amount of the padding corresponds to a transmission time that is equal to the delay going around the braided ring network.

Example 65 includes the method of Example 64, wherein the amount of the padding is equal to the node delay times number of nodes in the ring/2−size of the hop count field+Example 1.

Example 66 includes the method of any of Examples 61-62, wherein a frame of the first data stream includes a preamble, address information, a data field, padding, and a cyclic redundancy check (CRC) field.

Example 67 includes the method of Example 66, wherein the amount of the padding corresponds to a transmission time that is equal to the delay going around the braided ring network.

Example 68 includes the method of Example 67, wherein the amount of the padding is equal to a node delay times a number of nodes in the braided ring network/2−size of the CRC field+Example 1.

Example 69 includes the method of any of Examples 61-68, wherein stopping the first data stream includes setting a ring integrity flag in a tail of the message to indicate a fault.

Example 70 includes the method of any of Examples 61-69, wherein the self-checking pair comprises either: a real self-checking pair where both the first member node and the second member node are source nodes; or a virtual self-checking pair where only the first member node is a source node.

Example 71 includes the method of any of Examples 61-70, further comprising: stopping transmission of the first data stream and the second data stream if the first data stream that the third node receives from the first member node is not identical to the second data stream that the third node receives from the second member node; and stopping transmission of the first data stream and the second data stream if the first data stream that the fourth node receives from the first member node is not identical to the second data stream that the fourth node receives from the second member node.

Example 72 includes the method of any of Examples 61-71, wherein stopping the transmission of the first data stream and the second data stream comprises truncating an end portion of the first data stream and the second data stream to indicate an incomplete transmission.

Example 73 includes a network comprising: a plurality of nodes; and a plurality of links communicatively coupling each of the plurality of nodes to at least one respective adjacent node of the plurality of nodes via a first communication channel and to another respective adjacent node of the plurality of nodes via a second communication channel, wherein the plurality of nodes and the plurality of links have a braided ring topology; wherein a first node and a second node of the plurality of nodes are configured to source data, wherein the first node and the second node are adjacent nodes or separated by a single node, wherein the first node is configured to send a first data stream to a third node of the plurality of nodes that is adjacent the first node and to a fourth node of the plurality of nodes that is adjacent the second node; wherein the second node is configured to send a second data stream to the third node and the fourth node; wherein at least one of the first node and fourth node is configured to terminate transmission of the first data stream when the first stream does not match the first data stream received by the first node or the fourth node; wherein at least one of the second node and third node is configured to terminate transmission of the second data stream when the second data stream sent by the second node does not match the second data stream received by the second node or the third node.

Example 74 includes the network of Example 73, wherein the first data stream includes an amount of padding such that the first data stream is received by the first member node prior to completion of the first data stream; and wherein the second data stream includes an amount of padding such that the second data stream is received by the second member node prior to completion of the second data stream.

Example 75 includes the network of Example 74, wherein a frame of the first data stream includes a data field, a hop count field, the padding, and a ring integrity flag.

Example 76 includes the network of Example 75, wherein the amount of padding corresponds to a transmission time that is equal to the delay going around the braided ring network.

Example 77 includes the network of Example 76, wherein the amount of padding is equal to the node delay times number of nodes in the ring/2−size of the hop count field+Example 1.

Example 78 includes the network of Examples 74, wherein a frame of the first data stream includes a preamble, address information, a data field, padding, and a cyclic redundancy check (CRC) field.

Example 79 includes the network of Example 78, wherein the amount of padding corresponds to a transmission time that is equal to the delay going around the braided ring network.

Example 80 includes the network of Example 79, wherein the amount of padding is equal to a node delay times a number of nodes in the braided ring network/2−size of the CRC field+Example 1.

Example 81 includes the network of any of Examples 73-80, wherein the first node or the fourth node is configured to terminate the first data stream by setting a ring integrity flag in a tail of the message to indicate a fault, wherein the second node or the third node is configured to terminate the second data stream by setting a ring integrity flag in a tail of the message to indicate a fault.

Example 82 includes the network of any of Examples 73-81, wherein the self-checking pair comprises either: a real self-checking pair where both the first node and the second node are source nodes; or a virtual self-checking pair where only the first node is a source node.

Example 83 includes the network of any of Examples 73-82, wherein at least one node of plurality of nodes is configured to terminate transmission of the first data stream and the second data stream when the first data stream does not match the second data stream.

Example 84 includes the network of Example 83, wherein the at least one node is configured to increase a hop count to indicate a fault was detected.

Example 85 includes the network of any of Examples 73-84, wherein the plurality of links comprises: a first plurality of links communicatively coupling each of the plurality of nodes to a respective adjacent node on the first channel and a respective adjacent node on the second channel; and a second plurality of links communicatively coupling each of the plurality of nodes to a respective skip node on the first channel and a respective skip node on the second channel.

Example 86 includes the network of Example 85, wherein the second plurality of communication links are configured to communicate using a higher bandwidth or bit rate than the first plurality of communication links.

Example 87 includes a method, comprising: forming a first self-checking pair between a first node and a second node of a braided ring network, wherein the first node and the second node are adjacent to each other; forming a second self-checking pair between the first node and a third node of the braided ring network, wherein the second node is positioned between the first node and the third node in the braided ring network or the first node is positioned between the second node and the third node; providing a first paired broadcast with the first self-checking pair during a first timeslot; and providing a second paired broadcast with the second self-checking pair during a second timeslot.

Example 88 includes the method of Example 87, further comprising: forming a third self-checking pair between the second node and the third node of the braided ring network; and providing a third paired broadcast with the third self-checking pair during a third timeslot.

Example 89 includes the method of Example 88, further comprising: forming a fourth self-checking pair between the first node and a fourth node of the braided ring network, wherein the first node is positioned between the fourth node and the second node and the second node is positioned between the first node and the third node; and providing a fourth paired broadcast with the fourth self-checking pair during a fourth timeslot.

Example 90 includes the method of Example 89, further comprising: forming a fifth self-checking pair between the second node and a fourth node of the braided ring network; and providing a fifth paired broadcast with the fourth self-checking pair during a fourth timeslot.

Example 91 includes the method of Example 90, further comprising: scheduling the first self-checking pair to transmit a third paired broadcast and the second self-checking pair to transmit a fourth paired broadcast in a third timeslot, wherein either the third paired broadcast is scheduled to occur before the fourth paired broadcast in the third timeslot or the fourth paired broadcast is scheduled to occur before the third paired broadcast in the third timeslot.

Example 92 includes the method of Example 91, wherein when the third paired broadcast is scheduled to occur before the fourth paired broadcast and the third paired broadcast is successful, the method further comprises canceling the fourth paired broadcast in the third timeslot; and wherein when the fourth paired broadcast is scheduled to occur before the third paired broadcast and the fourth paired broadcast is successful, the method further comprises canceling the third paired broadcast in the third timeslot.

Example 93 includes the method of any of Examples 91-92, wherein when the third paired broadcast is scheduled to occur before the fourth paired broadcast and the third paired broadcast is unsuccessful, the method further comprises providing the fourth paired broadcast in the third timeslot; and wherein when the fourth paired broadcast is scheduled to occur before the third paired broadcast and the fourth paired broadcast is unsuccessful, the method further comprises providing the third paired broadcast in the third timeslot.

Example 94 includes the method of any of Examples 87-93, wherein the first self-checking pair and the second self-checking comprises either: a real self-checking pair where both nodes of the self-checking pair are source nodes; or a virtual self-checking pair where only one of the nodes of the self-checking pair is a source node.

Example 95 includes the method of any of Examples 87-94, wherein forming the first self-checking pair includes replicating self-checking computations on the first node and the second node and executing ingress congruency agreements via a first point-to-point connection between the first node and the second node; wherein forming the second self-checking pair includes replicating self-checking computations on the first node and the third node and executing ingress congruency agreements via a second point-to-point connection between the first node and the third node.

Example 96 includes a network comprising: a plurality of nodes; and a plurality of links communicatively coupling each of the plurality of nodes to at least one respective adjacent node of the plurality of nodes via a first communication channel and to another respective adjacent node of the plurality of nodes via a second communication channel, wherein the plurality of nodes and the plurality of links have a braided ring topology; wherein a first node and a second node of the plurality of nodes are configured to form a first self-checking pair, wherein the first node and the second node are adjacent nodes, wherein at least one of the first node and the second node is a source node; wherein the first node and a third node of the plurality of nodes are configured to form a second self-checking pair, wherein the second node is between the first node and the third node or the first node is positioned between the second node and the third node; wherein the first self-checking pair is configured to provide a first paired broadcast during a first timeslot; wherein the second self-checking pair is configured to provide a second pair broadcast during a second timeslot.

Example 97 includes the network of Example 96, further comprising: wherein the second node and the third node are configured to form a third self-checking pair; wherein the third self-checking pair is configured to provide a third paired broadcast during a third timeslot.

Example 98 includes the network of Example 97, wherein the first node and a fourth node of the plurality of nodes are configured to form a fourth self-checking pair, wherein the first node is positioned between the fourth node and the second node, wherein the second node is positioned between the first node and the third node, wherein the fourth self-checking pair is configured to provide a fourth paired broadcast during a fourth timeslot.

Example 99 includes the network of Example 98, wherein the second node and the fourth node are configured to form a fifth self-checking pair, wherein the fifth self-checking pair is configured to provide a fifth paired broadcast during a fourth timeslot.

Example 100 includes the network of any of Examples 96-99, wherein the first self-checking pair is configured to transmit a third paired broadcast during a third timeslot and the second self-checking pair is configured to transmit a fourth paired broadcast during the third timeslot, wherein either the third paired broadcast is scheduled to occur before the fourth paired broadcast during the third timeslot or the fourth paired broadcast is scheduled to occur before the third paired broadcast during the third timeslot.

Example 101 includes the network of Example 100, wherein when the third paired broadcast is scheduled to occur before the fourth paired broadcast and the third paired broadcast is successful, the second self-checking pair is configured to cancel the fourth paired broadcast during the third timeslot; and wherein when the fourth paired broadcast is scheduled to occur before the third paired broadcast and the fourth paired broadcast is successful, the first self-checking pair is configured to cancel the third paired broadcast during the third timeslot.

Example 102 includes the method of Example 101, wherein when the third paired broadcast is scheduled to occur before the fourth paired broadcast and the third paired broadcast is unsuccessful, the second self-checking pair is configured to transmit the fourth paired broadcast during the third timeslot; and wherein when the fourth paired broadcast is scheduled to occur before the third paired broadcast and the fourth paired broadcast is unsuccessful, the first self-checking pair is configured to transmit the third paired broadcast during the third timeslot.

Example 103 includes the network of any of Examples 96-102, wherein the first self-checking pair and the second self-checking comprises either: a real self-checking pair where both nodes of the self-checking pair are source nodes; or a virtual self-checking pair where only one of the nodes of the self-checking pair first member node is a source node.

Example 104 includes the network of any of Examples 96-103, wherein the first node and the second node are configured to form the first self-checking pair by replicating self-checking computations on the first node and the second node and executing ingress congruency agreements via a first point-to-point connection between the first node and the second node; wherein the first node and the third node are configured to form the second self-checking pair by replicating self-checking computations on the first node and the third node and executing ingress congruency agreements via a second point-to-point connection between the first node and the third node.

Example 105 includes the network of any of Examples 96-104, wherein the plurality of links comprises: a first plurality of links communicatively coupling each of the plurality of nodes to a respective adjacent node on the first channel and a respective adjacent node on the second channel; and a second plurality of links communicatively coupling each of the plurality of nodes to a respective skip node on the first channel and a respective skip node on the second channel.

Example 106 includes the network of Example 105, wherein the second plurality of communication links are configured to communicate using a higher bandwidth or bit rate than the first plurality of communication links.

Example 107 includes a braided ring network comprising: a plurality of nodes; a first plurality of communication links communicatively coupling each of the plurality of nodes to a respective adjacent node on a first communication path of the braided ring network and a respective adjacent node on a second communication path of the braided ring network; and a second plurality of communication links communicatively coupling each of the plurality of nodes to a respective skip node on the first communication path of the braided ring network and a respective skip node on the second communication path of the braided ring network; wherein the second plurality of communication links are configured to communicate using a higher bandwidth than the first plurality of communication links and/or a higher bit rate than the first plurality of communication links.

Example 108 includes the network of Example 107, wherein each node of the plurality of nodes is configured to relay communications via the second plurality of communication links.

Example 109 includes the network of any of Examples 107-108, wherein each node of the plurality of nodes is configured to convey signatures for high-integrity communications via the first plurality of communication links.

Example 110 includes the network of any of Examples 107-109, wherein each node of the plurality of nodes is configured to send complete high-integrity messages via the first plurality of communication links.

Example 111 includes the network of any of Examples 107-110, wherein each of the first plurality of communication links is implemented using a 1 Gbps communication medium, wherein each of the second plurality of communication links is implemented using 10. Gbps communication medium.

Example 112 includes the network of any of Examples 107-111, wherein the second plurality of communication links are configured to communicate using a higher bandwidth than the first plurality of communication links and a higher bit rate than the first plurality of communication links.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
forming a first self-checking pair including a self-checking node and a first node adjacent to the self-checking node in a network;
forming a second self-checking pair including the self-checking node and a second node adjacent to the self-checking node in the network, wherein the self-checking node is positioned between the first node and the second node in the network;
transmitting a first paired broadcast with the first self-checking pair; and
transmitting a second paired broadcast with the second self-checking pair;
wherein transmitting the first paired broadcast comprises:
sending a first communication from a first processor of the self-checking node to the second node;
sending the first communication from the first processor of the self-checking node to a third node that is adjacent to the first node in the network, wherein the first node is positioned between the self-checking node and the third node in the network;
sending a second communication from the first node to the second node; and
sending the second communication from the first node to the third node.

2. The method of claim 1, wherein transmitting the second paired broadcast comprises:
sending a third communication from a second processor of the self-checking node to the first node;
sending the third communication from the second processor of the self-checking node to a fourth node, wherein the second node is positioned between the self-checking node and the fourth node in the network;
sending a fourth communication from the second node to the first node; and
sending the fourth communication from the second node to the fourth node.

3. The method of claim 2, further comprising:
stopping transmission of the first communication and the second communication if the first communication from the first processor is not identical to the second communication from the first node; and
stopping transmission of the third communication and the fourth communication if the third communication from the second processor is not identical to the fourth communication from the second node.

4. The method of claim 3, wherein stopping transmission of the first communication and the second communication comprises modifying a hop count of the first communication and/or the second communication, wherein stopping transmission of the third communication and the fourth communication comprises modifying a hop count of the third communication and/or the fourth communication.

5. The method of claim 1, wherein the first communication is a first data stream that includes an amount of padding such that the first data stream is received by the first processor of the self-checking node prior to completion of the first data stream;
wherein the second communication is a second data stream that includes an amount of padding such that the second data stream is received by the first node prior to completion of the second data stream;
the method further comprising:
stopping, with the first processor of the self-checking node, transmission of the first data stream prior to completion of the first data stream if the first data stream sent to the third node is not identical to the first data stream that is received by the first processor of the self-checking node; and
stopping, with the first node, transmission of the second data stream prior to completion of the second data stream if the second data stream sent to the second node is not identical to the second data stream received by the first node.

6. The method of claim 5, wherein the network is a braided ring network.

7. A network comprising:
a plurality of nodes; and
a plurality of links communicatively coupling each of the plurality of nodes to at least one respective adjacent node of the plurality of nodes via a first communication path and to another respective adjacent node of the plurality of nodes via a second communication path;
wherein a self-checking node and a first node of the plurality of nodes are configured to source data for a first communication and a second communication, wherein the self-checking node and the first node are adjacent nodes;

wherein the self-checking node is configured to send the first communication to:
  a second node of the plurality of nodes that is adjacent the self-checking node; and
  a third node of the plurality of nodes that is adjacent the first node;

wherein the first node is configured to send the second communication to the second node and the third node;

wherein the self-checking node and the second node of the plurality of nodes are configured to source data for a third communication and a fourth communication;

wherein the self-checking node is configured to send the third communication to:
  the first node; and
  a fourth node of the plurality of nodes that is adjacent the second node;

wherein the second node is configured to send the fourth communication to the first node and the fourth node;

wherein at least one node of plurality of nodes is configured to prevent acceptance of the first communication and the second communication when the first communication does not match the second communication;

wherein at least one node of plurality of nodes is configured to prevent acceptance of the third communication and the fourth communication when the third communication does not match the fourth communication.

8. The network of claim 7, wherein the self-checking node comprises a first processor and a second processor;
  wherein the first processor of the self-checking node is configured to send the first communication to the second node and to the third node;
  wherein the second processor of the self-checking node is configured to send the third communication to the first node and the fourth node.

9. The network of claim 7, wherein the plurality of nodes is configured to send data streams using cut-through flooding propagation, wherein the first communication is a first data stream and the second communication is a second data stream.

10. The network of claim 9, wherein the at least one node is configured to modify a hop count of the first data stream and/or the second data stream such that the hop count is invalid.

11. The network of claim 9, wherein the first data stream includes an amount of padding such that the first data stream is received by the self-checking node prior to completion of the first data stream; and
  wherein the second data stream includes an amount of padding such that the second data stream is received by the first node prior to completion of the second data stream.

12. The network of claim 7, wherein the second node is configured to compare the first communication received from the self-checking node to the second communication received from the first node, wherein the second node is configured to prevent acceptance of the first communication and the second communication when the first communication does not match the second communication; and
  wherein the third node is configured to compare the first communication received from the self-checking node to the second communication received from the first node, wherein the third node is configured to prevent acceptance of the first communication and the second communication when the first communication does not match the second communication.

13. The network of claim 7, wherein a fourth node different than the second node and the third node is configured to compare the first communication received from the self-checking node to the second communication received from the first node, wherein the fourth node is configured to prevent acceptance of the first communication and the second communication when the first communication does not match the second communication.

14. The network of claim 7, wherein the network is a braided ring network.

15. A self-checking node of a network, comprising:
  a first near port configured to receive data on a first communication path of the network in a first direction from a first near neighbor node adjacent to the self-checking node, wherein the first near port is configured to send data to the first near neighbor node on a second communication path of the network in a second direction;
  a first skip port configured to receive data on the first communication path of the network in the first direction from a first skip neighbor node adjacent to the first near neighbor node, wherein the first skip port is configured to send data to the first skip neighbor node on the second communication path of the network in the second direction;
  a second near port configured to receive data on the second communication path of the network in the second direction from a second near neighbor node adjacent to the self-checking node, wherein the second near port is configured to send data to the second near neighbor node on the first communication path of the network in the first direction;
  a second skip port configured to receive data on the second communication path of the network in the second direction from a second skip neighbor node adjacent to the second near neighbor node, wherein the second skip port is configured to send data to the second skip neighbor node on the first communication path of the network in the first direction;
  a first processor configured to transmit data via the first near port and the second skip port;
  a second processor configured to transmit data via the second near port and the first skip port;
  wherein each of the first processor and the second processor are configured to receive data via the first near port, the first skip port, the second near port, and the second skip port.

16. The self-checking node of claim 15, wherein the self-checking node is configured to form a first self-checking pair with the second near neighbor node adjacent to the self-checking node in the network, wherein the first self-checking pair is configured to provide a first paired broadcast, wherein the first processor of the self-checking node is configured to transmit for the self-checking node for the first paired broadcast;
  wherein the self-checking node is configured to form a second self-checking pair with the first near neighbor node adjacent to the self-checking node in the network, wherein the second self-checking pair is configured to provide a second paired broadcast, wherein the second processor of the self-checking node is configured to transmit for the self-checking node for the second paired broadcast.

17. The self-checking node of claim 15, wherein the first processor is configured to transmit a first communication to the first near neighbor node via the first near port, wherein the first processor is configured to transmit the first communication to the second skip neighbor node via the second skip port;

wherein the second processor is configured to transmit a second communication to the second near neighbor node via the second near port, wherein the second processor is configured to transmit the second communication to the first skip neighbor node via the first skip port.

18. The self-checking node of claim 17, wherein the first processor and the second processor are further configured to:

transmit the first communication to the first near neighbor node by driving a first pass-through link coupled to a skip port of the first near neighbor node; and transmit the second communication to the second near neighbor node by driving a second pass-through link coupled to a skip port of the first near neighbor node.

19. The self-checking node of claim 15, wherein the network is a braided ring network.

* * * * *